US012783378B2

(12) United States Patent
Osborn et al.

(10) Patent No.: US 12,783,378 B2
(45) Date of Patent: Nov. 3, 2026

(54) GAME PERFORMANCE PREDICTION ACROSS A DEVICE ECOSYSTEM

(71) Applicant: Google LLC, Mountain View, CA (US)

(72) Inventors: William Roger Osborn, London (GB); Scott James Carbon-Ogden, London (GB)

(73) Assignee: Google LLC, Mountain View, CA (US)

( * ) Notice: Subject to any disclaimer, the term of this patent is extended or adjusted under 35 U.S.C. 154(b) by 386 days.

(21) Appl. No.: 18/497,713

(22) Filed: Oct. 30, 2023

(65) Prior Publication Data

US 2024/0152440 A1 May 9, 2024

Related U.S. Application Data

(60) Provisional application No. 63/381,731, filed on Oct. 31, 2022.

(51) Int. Cl.

| | |
|---|---|
| ***A63F 13/30*** | (2014.01) |
| ***A63F 13/77*** | (2014.01) |
| ***G06F 11/30*** | (2006.01) |
| ***G06F 11/34*** | (2006.01) |
| ***G07F 11/34*** | (2006.01) |

(52) U.S. Cl.

CPC .......... *G06F 11/3409* (2013.01); *A63F 13/30* (2014.09); *A63F 13/77* (2014.09); *G06F 11/302* (2013.01)

(58) Field of Classification Search

None

See application file for complete search history.

(56) References Cited

U.S. PATENT DOCUMENTS

| | | | |
|---|---|---|---|
| 2007/0004516 A1 | 1/2007 | Jordan et al. | |
| 2012/0209571 A1 | 8/2012 | Peterson et al. | |
| 2015/0217198 A1 | 8/2015 | Curtis et al. | |
| 2020/0384367 A1 | 12/2020 | Lake-Schaal et al. | |
| 2021/0073028 A1 * | 3/2021 | Li | G06F 9/5011 |
| 2022/0347583 A1 * | 11/2022 | He | G06F 3/04847 |

FOREIGN PATENT DOCUMENTS

CN 109740655 A 5/2019

OTHER PUBLICATIONS

Barman et al., "No-Reference Video Quality Estimation Basd on Machine Learning for Passive Gaming Video Streaming Applications", IEEE Access, vol. 7, No. 2019, Jun. 20, 2019, 17 pp.

Zadtootaghaj, "Models for Predicting the Quality of Experience of Cloud Gaming Services", Jul. 6, 2021, 155 pp., Retrieved from the Internet from https://do.tu-berlin.de/bitstream/11303/13721/5/zadtootaghaj_saman.pdf.

International Search Report and Written Opinion of International Application No. PCT/US2023/078251 dated Mar. 11, 2024, 10 pp.

* cited by examiner

*Primary Examiner* — Damon J Pierce

(74) *Attorney, Agent, or Firm* — Shumaker & Sieffert, P.A.

(57) ABSTRACT

A computing system may receive an indication of a gaming application and an indication of a computing device. The computing system may determine, using collaborative filtering of performance scores of a plurality of gaming applications executing at a plurality of computing devices, a predicted performance of the gaming application executing at the computing device. The computing system may send an indication of the predicted performance of the gaming application executing at the computing device.

16 Claims, 9 Drawing Sheets

FIG. 4A
INPUT
MACHINE-LEARNED MODEL
462
OUTPUT

GAME PERFORMANCE PREDICTION ACROSS A DEVICE ECOSYSTEM

This application claims the benefit of U.S. Provisional Patent Application No. 63/381,731, filed 31 Oct. 2022, the entire contents of which is incorporated herein by reference.

BACKGROUND

Computing devices within a device ecosystem may vary in many ways, such as central processing unit (CPU) performance, graphics processing unit (GPU) performance, display sizes and/or resolutions, memory performance, and the like. Due to such differences in device configurations, a gaming application developed to execute on a variety of computing devices within a device ecosystem may perform differently across the different computing devices within the device ecosystem. For example, a gaming application may output image data of the same fidelity at different frame rates while executing on different computing devices.

SUMMARY

In general, techniques of this disclosure are directed to determining the predicted performance of a gaming application on a computing device. The predicted performance indicates how well the gaming application is anticipated to perform when executing at the computing device. A computing system may predict the performance using information about the gaming application and information about the computing device. The computing system may receive such information from the gaming application executing at the computing device. The gaming application may send information identifying the gaming application and information identifying the computing device at which the gaming application is executing to the computing system.

The computing system may determine, using collaborative filtering of performance data of a plurality of gaming applications that execute at a plurality of computing devices, the predicted performance of the gaming application executing at the computing device. For example, the computing system may determine, out of a plurality of different gaming applications, another gaming application that performs most similarly to the gaming application across a variety of different computing devices. The computing system may therefore determine the predicted performance of the gaming application executing at the computing device based on the performance of the other gaming application that performs most similarly to the gaming application across the variety of different computing devices.

In some aspects, the techniques described herein relate to a method including: receiving, by one or more processors of a computing system, an indication of gaming application and an indication of a computing device; determining, by the one or more processors and using collaborative filtering of performance scores of a plurality of gaming applications executing at a plurality of computing devices, a predicted performance of the gaming application executing at the computing device; and sending, by the one or more processors, an indication of the predicted performance of the gaming application executing at the computing device.

In some aspects, the techniques described herein relate to a computing system including: memory; a network interface; and one or more processors operably coupled to the memory and the network interface and configured to: receive, via the network interface, an indication of gaming application and an indication of a computing device; determine, using collaborative filtering of performance scores of a plurality of gaming applications executing at a plurality of computing devices, a predicted performance of the gaming application executing at the computing device; and send, via the network interface, an indication of the predicted performance of the gaming application executing at the computing device.

In some aspects, the techniques described herein relate to a computer-readable storage medium storing instructions that, when executed, cause one or more processors of a computing system to: receive an indication of gaming application and an indication of a computing device; determine, using collaborative filtering of performance scores of a plurality of gaming applications executing at a plurality of computing devices, a predicted performance of the gaming application executing at the computing device; and send an indication of the predicted performance of the gaming application executing at the computing device.

The details of one or more examples are set forth in the accompanying drawings and the description below. Other features, objects, and advantages of the disclosure will be apparent from the description and drawings, and from the claims.

DETAILED DESCRIPTION

Figure 1:
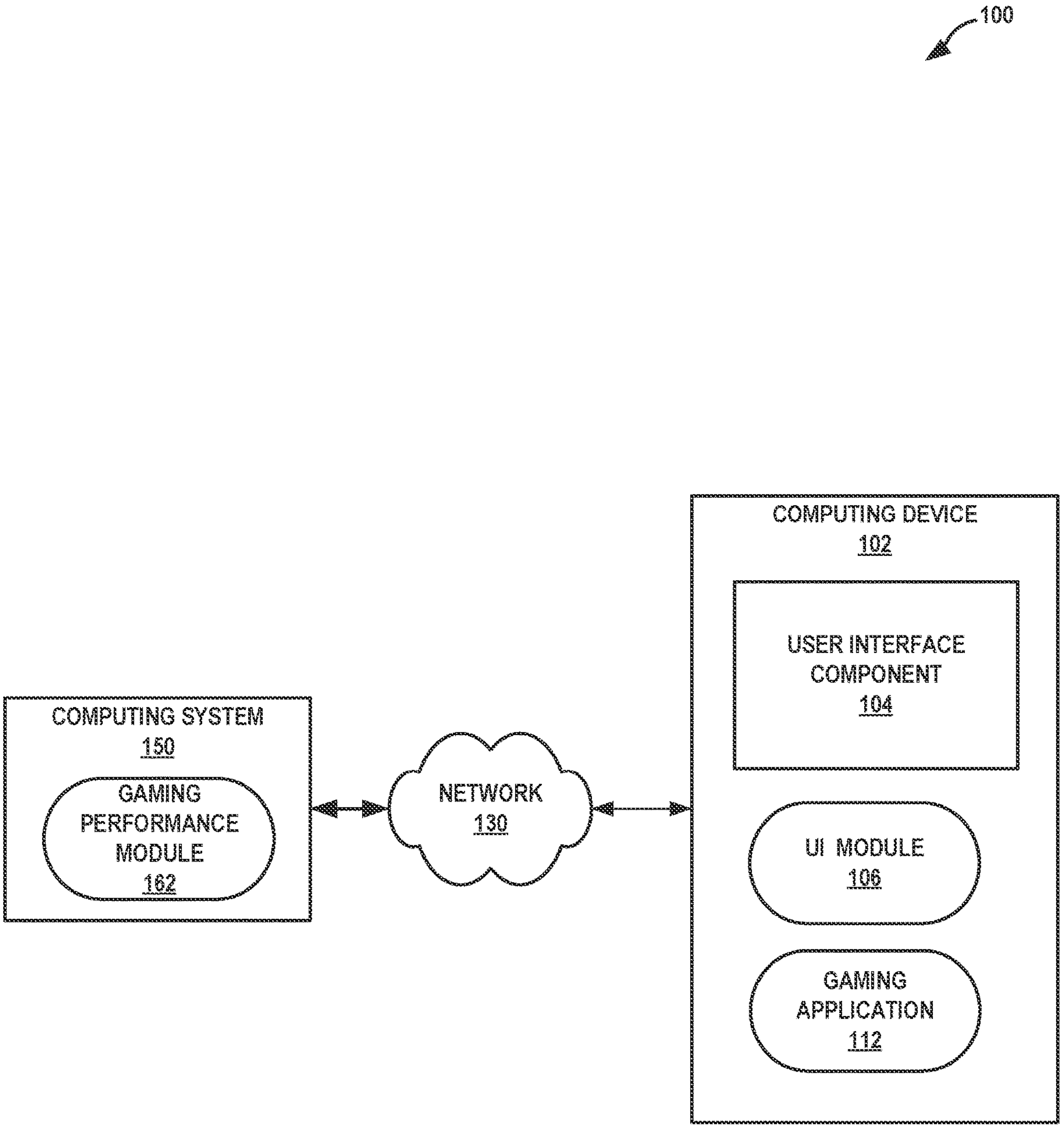
FIG. 1 is a conceptual diagram illustrating an example environment in which an example computing system is configured to determine the predicted performance of a gaming application at an example computing device using collaborative filtering, in accordance with one or more aspects of the present disclosure.

FIG. 1 is a conceptual diagram illustrating an example environment in which an example computing system is configured to determine the predicted performance of a gaming application at an example computing device using collaborative filtering, in accordance with one or more aspects of the present disclosure. In the example of FIG. 1, environment 100 may include computing device 102 and computing system 150 that communicate via network 130 to determine one or more predicted fidelity parameters for gaming application 112.

Computing system 150 may be any suitable remote computing system, such as one or more desktop computers, laptop computers, mainframes, servers, cloud computing systems, virtual machines, etc. capable of sending and receiving information via network 130. In some examples, computing system 150 may represent a cloud computing system that provides one or more services via network 130. That is, in some examples, computing system 150 may be a distributed computing system. One or more computing devices, such as computing device 102, may access the services provided by the cloud by communicating with computing system 150. While described herein as being performed at least in part by computing system 150, any or all techniques of the present disclosure may be performed by one or more other devices, such as computing device 102. That is, in some examples, computing device 102 may be operable to perform one or more techniques of the present disclosure alone.

Computing system 150 may include gaming performance module 162. Gaming performance module 162 may perform operations described herein using software, hardware, firmware, or a mixture of both hardware, software, and firmware residing in and executing on computing system 150 or at one or more other remote computing devices. In some examples, gaming performance module 162 may be implemented as hardware, software, and/or a combination of hardware and software. Computing system 150 may execute gaming performance module 162 with one or more processors. Computing system 150 may execute gaming performance module 162 as or within a virtual machine executing on underlying hardware. Gaming performance module 162 may be implemented in various ways. For example, gaming performance module 162 may be implemented as a downloadable or pre-installed application or "app." In another example, gaming performance module 162 may be implemented as part of an operating system of computing system 150. Other examples of computing system 150 that implement techniques of this disclosure may include additional components not shown in FIG. 1.

Network 130 may be any suitable network that enables communication between computing device 102 and computing system 150. Network 130 may include a wide-area network such as the Internet, a local-area network (LAN), a personal area network (PAN) (e.g., Bluetooth®), an enterprise network, a wireless network, a cellular network, a telephony network, a Metropolitan area network (e.g., WIFI, WAN, WiMAX, etc.), one or more other types of networks, or a combination of two or more different types of networks (e.g., a combination of a cellular network and the Internet).

Computing device 102 may include, but is not limited to, portable or mobile devices such as mobile phones (including smart phones), laptop computers, tablet computers, wearable computing devices such as smart watches or computerized eyewear, smart television platforms, cameras, computerized appliances, vehicle head units, etc. In some examples, computing device 102 may include stationary computing devices such as desktop computers, servers, mainframes, etc.

Computing device 102 may include user interface component 104 ("UIC 104") user interface module 106 ("UI module 106"), and gaming application 112. UI module 106 and gaming application 112 may perform operations described herein using software, hardware, firmware, or a mixture of both hardware, software, and firmware residing in and executing on computing device 102 or at one or more other remote computing devices. In some examples, UI module 106 and gaming application 112 may be implemented as hardware, software, and/or a combination of hardware and software. Computing device 102 may execute module 106 and gaming application 112 with one or more processors. Computing device 102 may execute any of UI module 106 and gaming application 112 as or within a virtual machine executing on underlying hardware. UI module 106 and gaming application 112 may be implemented in various ways. For example, any of module 106 and/or gaming application 112 may be implemented as a downloadable or pre-installed application or "app." In another example, any of UI module 106 and gaming application 112 may be implemented as part of an operating system of computing device 102. Other examples of computing device 102 that implement techniques of this disclosure may include additional components not shown in FIG. 1.

UIC 104 of computing device 102 may function as an input device for computing device 102 and as an output device. For instance, UIC 104 may function as an input device using a resistive touchscreen, a surface acoustic wave touchscreen, a capacitive touchscreen, a projective capacitive touchscreen, a pressure sensitive screen, an acoustic pulse recognition touchscreen, or another presence-sensitive screen technology. UIC 104 may function as an output device using any one or more of a liquid crystal display (LCD), dot matrix display, light emitting diode (LED) display, microLED, organic light-emitting diode (OLED) display, e-ink, or similar monochrome or color display capable of outputting visible information to the user of computing device 102.

In some examples, UIC 104 may include a presence-sensitive screen that may receive tactile user input from a user of computing device 102. UIC 104 may receive the tactile user input by detecting one or more taps and/or gestures from a user of computing device 102 (e.g., the user touching or pointing to one or more locations of UIC 104 with a finger or a stylus pen). The presence-sensitive screen of UIC 104 may present output to a user. UIC 104 may present the output as a user interface, which may be related to functionality provided by computing device 102. For example, UIC 104 may present various functions and applications executing on computing device 102 such as an electronic message application, a messaging application, a map application, etc.

UI module 106 may be implemented in various ways. For example, UI module 106 may be implemented as a downloadable or pre-installed application or "app." In another example, UI module 106 may be implemented as part of a hardware unit of computing device 102. In another example, UI module 106 may be implemented as part of an operating system of computing device 102. In some instances, portions of the functionality of UI module 106 or any other module described in this disclosure may be implemented across any combination of an application, hardware unit, and operating system.

UI module 106 may interpret inputs detected at UIC 104 (e.g., as a user provides one or more gestures at a location of UIC 104 at which a user interface is displayed). UI module 106 may relay information about the inputs detected at UIC 104 to one or more associated platforms, operating systems, applications, and/or services executing at computing device 102 to cause computing device 102 to perform a function. UI module 106 may also receive information and instructions from one or more associated platforms, operating systems, applications, and/or services executing at computing device 102 (e.g., gaming application 112) for generating a graphical user interface (GUI). In addition, UI module 106 may act as an intermediary between the one or more associated platforms, operating systems, applications, and/or services executing at computing device 102 and various output devices of computing device 102 (e.g., speakers, LED indicators, vibrators, etc.) to produce output (e.g., graphical, audible, tactile, etc.) with computing device 102.

In the example of FIG. 1, computing device 102 includes gaming application 112 that executes at computing device 102 to perform the functionality of a video game. Although shown as operable by computing device 102, gaming application 112 may, in some examples, be operable by a remote computing device that is communicatively coupled to computing device 102. In such examples, a gaming application executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from computing device 102.

In some examples, gaming application 112 may be an action game that may emphasize hand-eye coordination and reaction time, such as a first-person shooter game, a battle royale game, etc. In some examples, gaming application 112 may be a simulation game, such as a motorsports simulation game, an airplane simulation game, a trucking simulation game, and the like. In other examples, gaming application 112 may be a role playing game (e.g., a massive multiplayer role playing game), a networked multi-player game, a single player game, and the like.

As gaming application 112 executes at computing device 102, gaming application 112 may output image data for display at UIC 104. Image data, in some examples, may be frames of graphics that gaming application 112 outputs for display at UIC 104 during execution of gaming application 112. For example, the image data may include frames of graphics of the interactive gameplay environment, frames of graphics of loading screens, frames of graphics of menu screens, and the like.

Gaming application 112 may render and output image data according to one or more fidelity parameters associated with the image fidelity of the image data rendered and outputted by gaming application 112. In some examples, a fidelity parameter includes a target frame rate, such as a target frames per second (fps), at which it is desired that gaming application 112 outputs image data. The frame rate of the image data outputted by gaming application 112 may be the rate at which gaming application 112 outputs frames of graphics. Examples of the frame rate at which gaming application 112 outputs image data may include 30 fps, 60 fps, 120 fps, 144 fps, and the like. Gaming application 112 may output image data at different frame rates in different situations and contexts. For example, gaming application 112 may output image data at different frame rates for different levels of the game, for different scenes of the game, and the like.

In some examples, a fidelity parameter may include a rendering quality of image data output by gaming application 112. The rendering quality of the image data may include the resolution of frames of graphics outputted by gaming application 112 (e.g., 640×480, 1280×720, 1920×1080, 2560×1440, 3840×2160, etc.), the graphical complexity of elements of objects in a scene outputted by gaming application 112, whether gaming application 112 applies anti-aliasing to the image data and/or the type of anti-aliasing applied by gaming application 112 to the image data, the type of texture filtering applied by gaming application 112 to the image data, and/or any other factors that may alter the perceived graphics quality of image data outputted by gaming application 112.

In some examples, a fidelity parameter may include the model quality in gaming application 112. The model quality may be the graphical and/or rendering quality of objects, characters, and scenes in gaming application 112. For example, given an image of a forest of trees being outputted by gaming application, the model quality of the forest may include or indicate the number of trees rendered by gaming application 112 in the forest, the level of detail the leaves on the trees rendered by gaming application 112, the physics model used to simulate wind blowing the leaves of the trees in the forest, and the like.

Gaming application 112 may be divided into one or more gaming sections. For example, if gaming application 112 has a plurality of different levels, which may also be referred to as maps, stages, rounds, etc., each level of gaming application 112 may be a section. In some examples, if one or more levels of gaming application 112 has one or more sub-levels or scenes, each of the one or more sub-levels or scenes may be a gaming section of gaming application 112.

In some examples, different gaming sections of gaming application 112 may be associated with different gameplay states of gaming application 112. For example, gaming application 112 in a gaming state (i.e., when gaming application 112 is providing an interactive gameplay environment for active gameplay by the user of computing device 102) may be a different gaming section from gaming application 112 in a non-gaming state (i.e., when gaming application 112 is not providing an interactive gameplay environment for active gameplay by the user of the computing device 102, such as when gaming application 112 outputs a menu screen, a lobby screen, or a waiting room screen). In another example, a single player mode of gaming application 112 and a multi-player mode of gaming application 112 may be different sections of gaming application 112.

Gaming application 112 may perform differently on different computing devices. For example, different computing devices may have different amounts of memory, different central processing units (CPUs) that may operate at different operating frequencies, and/or different graphics processing units (GPUs) that may operate at different operating frequencies. As such, different computing devices that execute gaming application 112 operating at a particular rendering quality of image data and/or a particular model quality may cause gaming application 112 to output image data at different frame rates when executing at the different computing devices. While some computing devices may be able to execute gaming application 112 operating at a particular rendering quality of image data and/or a particular model quality to cause gaming application 112 to output image data at or above a target frame rate for gaming application 112, other computing devices may not be able to cause gaming application 112 to output image data at or above the target frame rate when gaming application 112 operating at a particular rendering quality of image data and/or a particular model quality.

The developer of gaming application 112 may prefer to adjust the fidelity parameters of gaming application 112 based on the computing device that executes gaming application 112 so that the computing device can execute gaming application 112 to output image data at or above a target frame rate for gaming application 112. In some examples, the developer of gaming application 112 may test gaming application 112 on a variety of different computing devices to determine, for each of the different computing devices, the fidelity parameters of gaming application 112 that would enable a computing device to execute gaming application 112 to output image data at or above a target frame rate for gaming application 112.

The developer of gaming application 112 may include in gaming application 112 or may store at computing system 150, a list of computing devices on which gaming application 112 has been tested. The developer of gaming application 112 may also include in gaming application 112 or may store at computing system 150, for each of the computing devices on which gaming application 112 has been tested, an association of the computing device with the fidelity parameters of gaming application 112 that would enable a computing device to execute gaming application 112 to output image data at or above a target frame rate for gaming application 112. When a computing device executes gaming application 112, the gaming application 112 may look up the fidelity parameters associated with the computing device and may set the fidelity parameters of gaming application 112 to the fidelity parameters associated with the computing device so that the computing device may be able to execute gaming application 112 to output image data at or above a target frame rate for gaming application 112.

However, gaming application 112 may be able to run on tens of thousands or hundreds of thousands of different types and models of computing devices. In addition, new devices capable of executing gaming application 112 are also constantly being introduced. Storing fidelity parameters for each of these numerous computing devices may use an excess amount of storage space on a computing device and/or on computing system 150.

Furthermore, it may not be practicable for a developer of gaming application 112 to test gaming application 112 on even a small portion of computing devices that are able to execute gaming application 112. Thus, a computing device that has not been tested by the developer of gaming application 112 may not be able to execute gaming application 112 to output image data at or above a target frame rate for gaming application 112.

In accordance with aspects of this disclosure, computing device 102 may communicate with computing system 150 to determine a predicted performance of gaming application 112 executing at computing device 102. To determine the predicted performance of gaming application 112 executing at computing device 102, computing device 102 may send, to computing system 150 via network 130, an indication of computing device 102 and an indication of gaming application 112. In some examples, if gaming application 112 includes one or more gaming sections, the indication of gaming application 112 may include an indication of a gaming section of gaming application 112.

The indication of computing device 102 may include any combination of an indication of the brand of computing device 102, an indication of the model of computing device 102, an indication of the operating system installed at computing device 102, an indication of an amount of memory of computing device 102, an indication of the number of central processing units (CPUs) and/or the number of processing cores of the one or more CPUs of computing device 102, an indication of the number of graphics processing units (GPUs) and/or the number of processing cores of the one or more GPUs of computing device 102, an indication of the operating frequencies of the one or more CPUs and/or one or more GPUs of computing device 102, the operating system of computing device, the version of the operating system of computing device 102, and/or any other relevant information that can be used to determine the performance of computing device 102.

The indication of gaming application 112 and/or a gaming section of gaming application 112 may include any combination of a software package name of gaming application 112, a software package version number of gaming application 112, an indication of one or more current fidelity parameters of gaming application 112 and/or of the gaming section of gaming application 112, annotations associated with gaming application 112, and/or any other relevant information that can be used to identify gaming application 112 and/or the gaming section of gaming application 112.

Computing system 150 may receive, from computing device 102 via network 130, an indication of computing device 102 and an indication of gaming application 112. Gaming performance module 162 may execute at computing system 150 to, determine, based at least in part on the indication of computing device 102 and the indication of gaming application 112, a predicted performance of gaming application 112 when executing at computing device 102. If the indication of gaming application 112 includes an indication of a gaming section of gaming application 112, gaming performance module 162 may execute to determine a predicted performance of the gaming section of gaming application 112 when executing at computing device 102.

The predicted performance of gaming application 112 or a gaming section of gaming application 112 may be a value that corresponds to how well gaming application 112 or a gaming section of gaming application 112, given the characteristics of computing device 102 and the characteristics (e.g., fidelity parameters) of gaming application 112, is likely to perform when executing at computing device 102. In some examples, the predicted performance may be or correspond to a frame time, which is the amount of time (e.g., in milliseconds) gaming application 112 is predicted to take in order to render a frame of image data while executing at computing device 102. In some examples, the predicted performance may be a value that indicates a percentile frame time for gaming application 112 executing at computing device 102, such as the $90^{th}$ percentile frame time for gaming application 112 executing at computing device 102. For example, a predicted performance that indicates a $90^{th}$ percentile frame time of 33 milliseconds indicates that 90% of the frame time for gaming application 112 executing at computing device 102 falls below 33.3 milliseconds.

In accordance with the techniques of this disclosure, gaming performance module 162 may use a collaborative filtering technique to determine, based at least in part on the indication of computing device 102 and the indication of gaming application 112, a predicted performance of gaming application 112 that executes at computing device 102. If gaming performance module 162 receives an indication of gaming application 112 that includes an indication of a gaming section of gaming application 112, the predicted performance of gaming application 112 when executing at computing device 102 may be the predicted performance of the indicated gaming section of gaming application 112 when executing at computing device 102. Collaborative filtering is a technique used to filter for information or patterns using techniques involving collaboration amongst multiple entities. For example, collaborative filtering is used by recommender systems to make predictions about interests of a user by collecting preference or taste information from many users under the assumption that a first person that has the same opinion as a second person on a first issue is more likely to agree with the opinion of the second person on a second issue than that of a randomly chosen person.

Gaming performance module 162 may use collaborative filtering to determine the predicted performance of gaming application 112 executing at computing device 102. To determine the predicted performance of gaming application 112 executing at computing device 102 using collaborative filtering, gaming performance module 162 may determine, out of a plurality of different gaming applications, another gaming application that performs most similarly to the performance of gaming application 112 across a variety of different computing devices. Gaming performance module 162 may, in response to determining the other gaming application, determine the performance of the other gaming application when executing at a computing device that corresponds to computing device 102. Such a computing device that corresponds to computing device 102 may be a computing device of the same brand, of the same model, having the same CPU and/or GPU performance, and/or having the same memory performance, etc. as computing device 102.

Gaming performance module 162 may determine the predicted performance of gaming application 112 executing at computing device 102 based at least in part on the performance of the other gaming application when executing at a computing device that corresponds to computing device 102. For example, gaming performance module 162 may set the predicted performance of gaming application 112 executing at computing device 102 as the performance of the other gaming application when executing at a computing device that corresponds to computing device 102.

Gaming performance module 162 may determine the predicted performance of gaming application 112 executing at computing device 102 based at least in part on the performance score of gaming application 112 when executing at the other computing device that performs most similarly to computing device 102. For example, gaming performance module 162 may set the predicted performance of gaming application 112 executing at computing device 102 to the performance of gaming application 112 when executing at the other computing device that performs that performs most similarly to the performance of computing device 102 across a variety of different gaming applications and/or across a variety of different gaming sections of different gaming applications.

In some examples, gaming performance module 162 may implement one or more neural networks that uses collaborative filtering to determine a predicted performance of gaming application 112 executing at computing device 102. In general, one or more neural networks implemented by gaming performance module 162 may include multiple interconnected nodes, and each node may apply one or more functions to a set of input values that correspond to one or more features, and provide one or more corresponding output values. The one or more features may be indications of gaming application 112 and computing device 102, and the one or more corresponding output values of one or more neural networks may be an indication of a predicted performance of gaming application 112 executing at computing device 102.

Computing system 150 may, in response to determining the predicted performance of gaming application executing at computing device 102, send, to computing device 102 via network 130, an indication of the predicted performance of gaming application 112 executing at computing device 102. In some examples, the predicted performance of gaming application 112 may be frame rate information. For example, computing system 150 may send, to computing device 102, frame rate information, such as a predicted frame time (e.g., a $90^{th}$ percentile frame time) or a predicted frame rate (e.g., a $90^{th}$ percentile frame rate), for gaming application 112 executing at computing device 102.

Computing device 102 may receive the indication of the predicted performance of gaming application 112 executing at computing device 102 and may, in response, adjust one or more parameters of gaming application 112 based on the predicted performance of gaming application 112 executing at computing device 102. In some examples, if the predicted performance of gaming application 112 executing at computing device 102 includes frame rate information, such as the predicted $90^{th}$ percentile frame rate of gaming application 112 executing at computing device 102, computing device 102 may determine, based on the frame rate information, whether to adjust one or more parameters of gaming application 112 to increase the frame rate of gaming application 112. For example, if the predicted performance of gaming application 112 indicates a predicted $90^{th}$ percentile frame rate of 45 fps, and if gaming application 112 should optimally execute to produce a frame rate of 60 fps, gaming application 112 may adjust one or more fidelity parameters to increase the frame rate of gaming application 112. For example, gaming application 112 may reduce the rendering quality of the image data outputted by gaming application 112, reduce the model quality of gaming application 112, and the like in order to increase the frame rate of gaming application 112.

The techniques of this disclosure provide one or more technical advantages. By determining the predicted performance of a gaming application at a computing device, the techniques of this disclosure may enable a gaming application to adaptively adjust one or more parameters of the gaming application, such as one or more fidelity parameters of the gaming application, in order to optimize the performance of the gaming application when executing at the computing device. For example, a gaming application may determine, based on the predicted gaming performance of the gaming application, adaptively adjust (e.g., lower) one or more fidelity parameters of the gaming application without user intervention to enable to gaming application to run more smoothly at the computing device, such as by enabling the gaming application to be able to consistently output frames of image data at a high rate (e.g., at or above 60 fps). This may improve the user experience of the gaming application executing at the computing device by ensuring that the gaming application is perceived to be smooth and responsive by users of the gaming application.

By determining the predicted performance of a gaming application at a computing device, the techniques of this disclosure may also obviate a potential need for a developer of a gaming application to test the gaming application on a wide variety of different computing devices and a potential need for computing system 150 or another computing device to store, for each of a variety of gaming applications, fidelity parameters for each of a wide variety of different computing devices. The techniques of this disclosure may therefore reduce the amount of storage space used by computing system 150 or another computing device to store such fidelity parameter information for a variety of gaming applications, thereby improving the functioning of computing system 150 and other computing devices, such as computing device 102.

Figure 2:
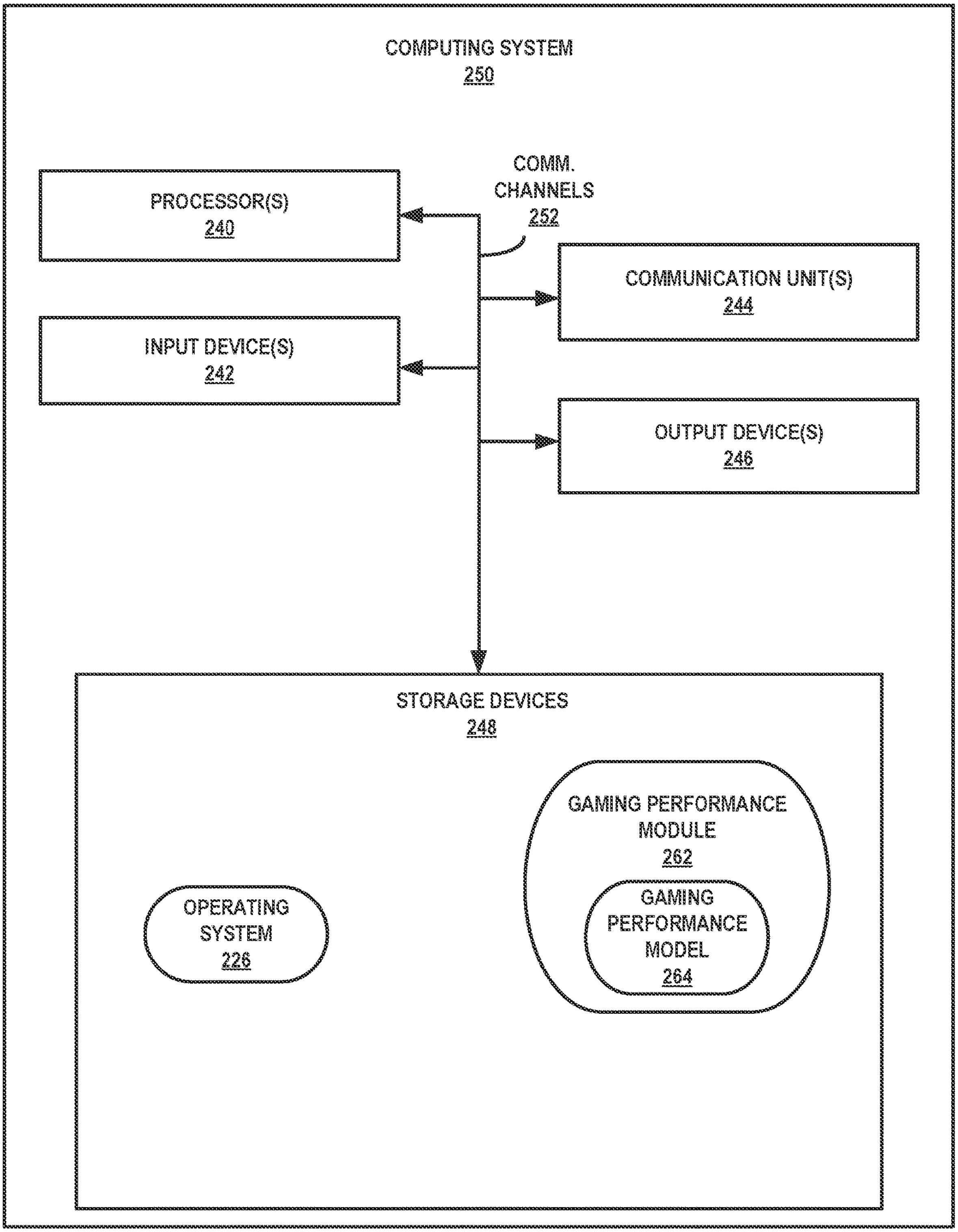
FIG. 2 is a block diagram illustrating an example computing system, in accordance with one or more aspects of the present disclosure.

FIG. 2 is a block diagram illustrating an example computing system, in accordance with one or more aspects of the present disclosure. FIG. 2 illustrates only one particular example of computing system 250, and many other examples of computing system 250 may be used in other instances and may include a subset of the components included in example computing system 250 or may include additional components not shown in FIG. 2. Computing system 250 may be an example of computing system 150 of FIG. 1.

As shown in the example of FIG. 2, computing system 250 includes one or more processors 240, one or more input devices 242, one or more communication units 244, one or more output devices 246, and one or more storage devices 248. One or more processors 240 may be an example of one or more processors 108 of FIG. 1. One or more input devices 242 and one or more output devices 246 may be examples of UIC 104 of FIG. 1. One or more storage devices 248 of computing system 250 also include operating system 226, and gaming performance module 262. Communication channels 252 may interconnect each of the components 240, 242, 244, 246, and 248 for inter-component communications (physically, communicatively, and/or operatively). In some examples, communication channels 252 may include a system bus, a network connection, one or more inter-process communication data structures, or any other components for communicating data between hardware and/or software.

One or more processors 240 may implement functionality and/or execute instructions within computing system 250. For example, one or more processors 240 on computing device 102 may receive and execute instructions stored by one or more storage devices 248 that provide the functionality of operating system 226 and gaming performance module 262. These instructions executed by one or more processors 240 may cause computing system 250 to store and/or modify information, within storage devices 48 during program execution. One or more processors 240 may execute instructions of operating system 226 and gaming performance module 262. That is, operating system 226 and gaming performance module 262 may be operable by one or more processors 240 to perform various functions described herein.

One or more processors 240 may be or include a digital signal processor (DSP), a general purpose microprocessor, application specific integrated circuit (ASIC), field programmable logic array (FPGA), and/or other equivalent integrated or discrete logic circuitry. One or more input devices 242 of computing system 250 may receive input. Examples of input are tactile, audio, kinetic, and optical input, to name only a few examples. One or more output devices 246 of computing device 102 may generate output. Examples of output are tactile, audio, and video output.

One or more communication units 244 of computing system 250 may communicate with external devices by transmitting and/or receiving data. For example, computing system 250 may use one or more communication units 244 to transmit and/or receive radio signals on a radio network such as a cellular radio network. In some examples, one or more communication units 244 may transmit and/or receive satellite signals on a satellite network such as a Global Positioning System (GPS) network. Examples of one or more communication units 244 include a network interface card (e.g. such as an Ethernet card), an optical transceiver, a radio frequency transceiver, a GPS receiver, or any other type of device that can send and/or receive information. Other examples of communication units 44 may include Bluetooth®, GPS, 3G, 4G, and Wi-Fi® radios found in mobile devices as well as Universal Serial Bus (USB) controllers and the like.

One or more storage devices 248 within computing system 250 may store information for processing during operation of computing system 250. In some examples, one or more storage devices 248 are a temporary memory, meaning that a primary purpose of one or more storage devices 248 is not long-term storage. One or more storage devices 248 on computing system 250 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

One or more storage devices 248, in some examples, also include one or more computer-readable storage media. One or more storage devices 248 may be configured to store larger amounts of information than volatile memory. One or more storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. One or more storage devices 248 may store program instructions and/or data associated with gaming performance module 262, which may be an example of gaming performance module 162 of FIG. 1, and operating system 226.

In accordance with techniques of the disclosure, computing system 250 is configured to receive, via one or more communication units 244, an indication of a gaming application and an indication of a computing device, and one or more processors 240 of computing system 250 are configured to execute gaming performance module 262 to determine a predicted performance of the gaming application when executing at the computing device. The indication of the computing device may include any combination of one or more features of the computing application, such as a brand, a model, an amount of memory, a number of CPUs and/or GPUs, benchmark data for the computing device, and the like. The indication of the gaming application may include any combination of one or more features of the gaming application, such as a software package name, a software package version number, one or more fidelity parameters, a gaming section and the like. When the indication of the gaming section includes an indication of a gaming section of the gaming application, gaming performance module 262 may execute to determine a predicted performance of the indicated gaming section of the gaming application when executing at the computing device.

One or more processors 240 of computing system 250 are configured to execute gaming performance module 262 to perform collaborative filtering to determine a predicted performance of the gaming application executing at the computing device. The predicted performance of a gaming application executing at a computing device may be a value that corresponds to how well the gaming application is likely to perform when executing at the computing device. In some examples, the predicted performance may include or correspond to frame rate information. The frame rate information, in some examples, includes a frame time, which is the amount of time (e.g., in milliseconds) the gaming application is predicted to take in order to render a frame of image data while executing at the computing device. In some examples, the frame rate information includes a percentile frame time for the gaming application executing at the computing device, such as the $90^{th}$ percentile frame time for the gaming application executing at the computing device. For example, a predicted performance that indicates a $90^{th}$ percentile frame time of 33 milliseconds may indicate that 90% of the frame time for the gaming application executing at the computing device falls below 33.3 milliseconds.

In some examples, the frame rate information may include a frame rate, which is the number of frames of image data the gaming application is predicted to render while executing at the computing device. In some examples, the frame rate information includes a percentile frame rate for the gaming application executing at the computing device, such as the 90$^{th}$ percentile frame rate for the gaming application executing at the computing device. For example, a predicted performance that indicates a 90$^{th}$ percentile frame rate of 60 frames per second may indicate that 90% of the frame time for the gaming application executing at the computing device falls below 60 frames per second.

In accordance with aspects of this disclosure, gaming performance module 262 may perform collaborative filtering to determine, for a gaming application and a computing device, a predicted performance of the gaming application executing at the computing device. In some examples, gaming performance module 262 may use performance data of a plurality of different gaming applications executing at a plurality of different computing devices to perform collaborative filtering to determine, for a particular gaming application and a particular computing device, a predicted performance of the particular gaming application executing at the particular computing device.

The performance data may include, for each respective gaming application of a plurality of different gaming applications, a performance score of the respective gaming application executing at one or more of a plurality of different computing devices, where each performance score may indicate the performance of the respective gaming application when executing at each of one or more of the plurality of different computing devices. The performance score for a gaming application and a computing device may indicate the performance of the gaming application executing at the computing device. That is, in some examples, the performance score of a gaming application executing at a computing device may correspond to a frame rate information, such as described above (e.g., a 90$^{th}$ percentile frame rate), of the gaming application executing at the computing device.

The performance data of a plurality of different gaming applications executing at a plurality of different computing devices may not necessarily include a performance score for every combination of the plurality of different gaming applications executing at the plurality of different computing devices. Instead, the performance data may be sparse, meaning that the performance data may include performance scores for some combinations of certain gaming applications executing at certain computing devices, and that the performance scores of other combinations of certain gaming applications executing at certain computing devices may not be known.

In some examples, to determine a predicted performance of a gaming application executing at a computing device, gaming performance module 262 may execute at one or more processors 240 to use the performance data (e.g., performance scores) of the plurality of different gaming applications executing at the plurality of different computing devices to determine a predicted performance of a gaming application executing at a computing device. Specifically, gaming performance module 262 may execute at one or more processors 240 to determine, for the gaming application, another gaming application that performs most similarly to the gaming application across a variety of computing devices.

For example, one or more processors 240 may execute gaming performance module 262 to determine, an aggregated performance of the gaming application across the plurality of different computing devices, which may be an aggregate of the performance scores of the gaming application executing on each of two or more the plurality of different computing devices. One or more processors 240 may execute gaming performance module 262 to determine aggregated performances for the plurality of gaming applications across the plurality of computing devices. That is, one or more processors 240 may execute gaming performance module 262 to determine, for each respective gaming application of the plurality of gaming applications, a respective aggregate performance of the respective gaming application executing on the plurality of different computing devices, which may be an aggregate of the respective performance scores of the respective gaming application executing on each of two or more of the plurality of different computing devices.

One or more processors 240 may therefore execute gaming performance module 262 to determine, for a gaming application, another gaming application, referred to herein as a second gaming application, out of the plurality of gaming applications that performs most similarly to the gaming application across the plurality of computing devices. For example, one or more processors 240 may execute gaming performance module 262 to determine, out of the plurality of gaming applications, a second gaming application having an aggregate performance across the plurality of different computing devices that is most similar to the aggregate performance of the gaming application across the plurality of different computing devices, such as another gaming application having an aggregated performance score that is closest to the aggregate performance score of the gaming application.

One or more processors 240 may execute gaming performance module 262 to determine the predicted performance of the gaming application executing at the computing device based at least in part on the performance of the second gaming application executing at a second computing device that corresponds to the computing device. A second computing device may correspond to the computing device by being the same brand and model of the computing device, have the same hardware specifications as the computing device, and the like. In some examples, one or more processors 240 may execute gaming performance module 262 to determine the predicted performance of the gaming application executing at the computing device to be the performance score of the second gaming application executing at the second computing device that corresponds to the computing device.

In some examples, one or more processors 240 may execute gaming performance module 262 to use the performance data (e.g., performance scores) of a plurality of different computing devices executing a plurality of different gaming applications to determine a predicted performance of a gaming application executing at a computing device. Specifically, one or more processors 240 may execute gaming performance module 262 to determine, for the computing device that executes the gaming application, another computing device (referred to herein as a second computing device) that performs most similarly to the computing device that executes the gaming application across a variety of gaming applications.

For example, one or more processors 240 may execute gaming performance module 262 to determine, an aggregated performance of the computing device across the plurality of different gaming applications, which may be an aggregate of the performance scores of the computing device executing each of two or more the plurality of different gaming applications. One or more processors 240 may also execute gaming performance module 262 to determine aggregated performances for a plurality of computing devices across a plurality of gaming applications. That is, one or more processors 240 may execute gaming performance module 262 to determine, for each respective computing device of the plurality of computing device, a respective aggregate performance of the respective computing device executing the plurality of gaming applications, which may be an aggregate of the respective performance scores of the respective computing device executing each of two or more of the plurality of different gaming applications.

One or more processors 240 may therefore execute gaming performance module 262 to determine, for a computing device that executes a gaming application, a second computing device out of the plurality of computing devices that performs most similarly to the computing device across the plurality of gaming applications. For example, one or more processors 240 may execute gaming performance module 262 to determine, out of the plurality of computing devices, a second computing device having an aggregate performance across the plurality of gaming applications that is most similar to the aggregate performance of the computing device across the plurality of gaming applications, such as a second computing device having an aggregated performance score that is closest to the aggregate performance score of the computing device. One or more processors 240 may execute gaming performance module 262 to determine the predicted performance of the gaming application executing at the computing device based at least in part on the performance of the second computing device. In some examples, one or more processors 240 may execute gaming performance module 262 to determine the predicted performance of the gaming application executing at the computing device to be the performance score of the second computing device when executed by the second computing device.

In some examples, gaming performance module 262 may include gaming performance model 264 that implements one or more neural networks that uses collaborative filtering to determine a predicted performance of a gaming application executing at a computing device. In general, one or more neural networks implemented by gaming performance model 264 may include multiple interconnected nodes, and each node may apply one or more functions to a set of input values that correspond to one or more features, and provide one or more corresponding output values. The details of gaming performance model 264 is described in more detail below.

In some examples, one or more processors 240 may execute gaming performance module 262 to determine one or more optimal fidelity parameter values for the gaming application that may enable the gaming application to achieve optimal performance (e.g., a minimum frame rate, a maximum frame time, a specified $90^{th}$ percentile frame rate, a specified $90^{th}$ percentile frame time, etc.) when executing at the computing device. For example, gaming performance module 262 may store or be able to otherwise access one or more optimal fidelity parameter values for each of a plurality of combinations of gaming applications and computing devices. One or more processors 240 may therefore execute gaming performance module 262 to search for the one or more optimal fidelity parameter values for the gaming application executing at the computing device to determine the one or more optimal fidelity parameter values for the gaming application.

One or more processors 240 may execute gaming performance module 262 to, in response to determining the predicted performance of the gaming application when executing at the computing device, send, using one or more communication units 244, an indication of the predicted performance of the gaming application executing at computing device. In some examples, gaming performance module 262 may send an indication of the predicted performance of the gaming application executing at the computing device to the computing device executing the gaming application, to enable the gaming application to adjust one or more fidelity parameters of the gaming application based on the predicted performance. For example, the gaming application may, in response to receiving the predicted performance, adjust one or more fidelity parameters of the gaming application to lower the fidelity of image data rendered by the gaming application in order to increase the performance of the gaming application at the computing device.

In some examples, gaming performance module 262 may also send an indication of one or more optimal fidelity parameter values for the gaming application to the computing device executing the gaming application. The gaming application may, in response to receiving the indication of the one or more optimal fidelity parameter values, adjust the one or more fidelity parameters of the gaming application based on the one or more optimal fidelity parameter values, such as by setting the one or more fidelity parameters of the gaming application to the one or more optimal fidelity parameter values.

In some examples, gaming performance module 262 may send an indication of the predicted performance of the gaming application executing at the computing device to a computing device associated with the developer of the gaming application, which may enable the developer of the gaming application to further develop and/or tune the gaming application based on the predicted performance. In some examples, gaming performance module 262 may send an indication of the predicted performance of the gaming application executing at the computing device to a computing device associated with the manufacturer of the computing device, which may enable the manufacturer of the computing device to develop updates to the computing device based on the predicted performance of the gaming application in order for updated versions of the computing device to better execute the gaming application.

Figure 3:
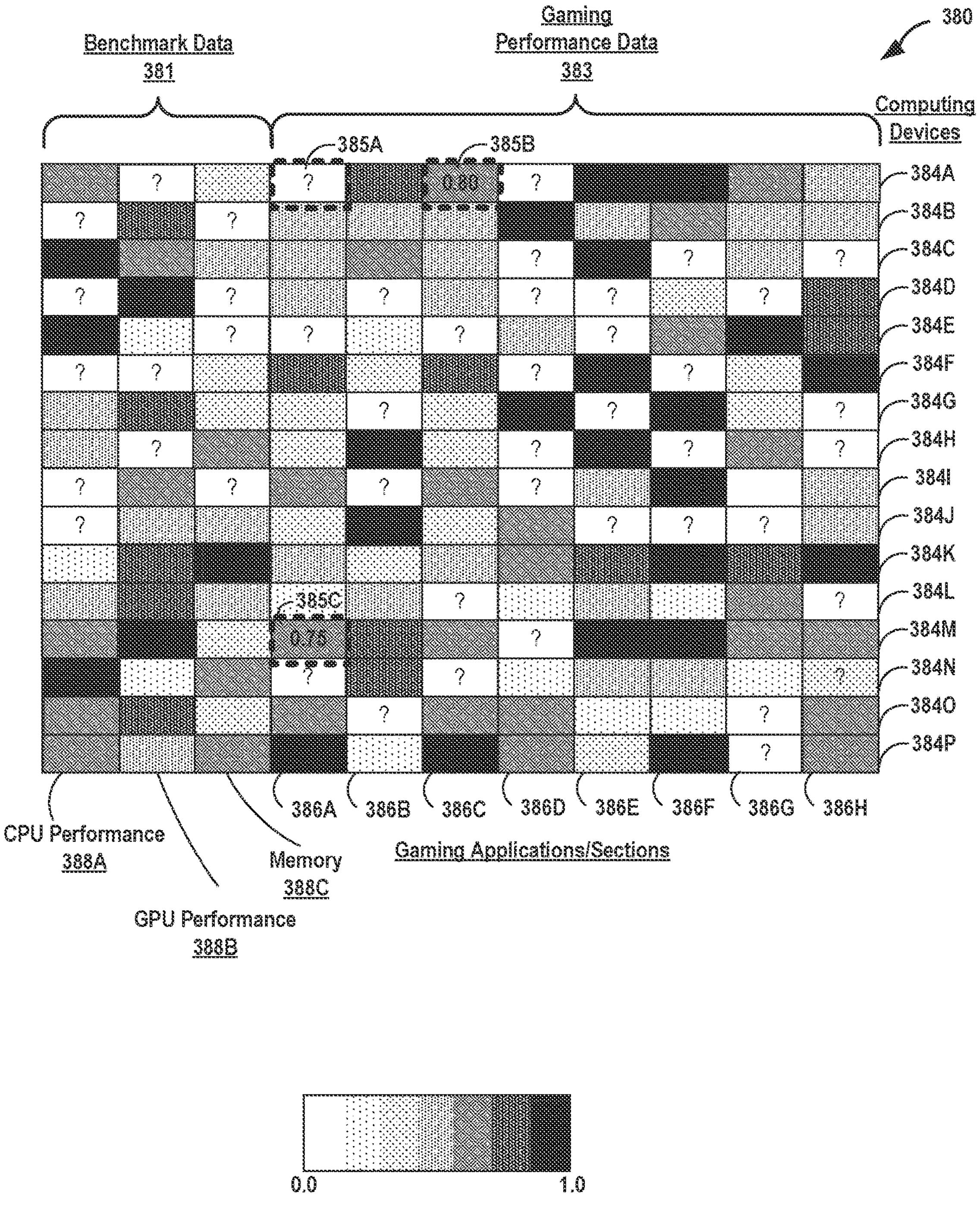
FIG. 3 illustrates an example sparse matrix of performance data used to perform collaborative filtering, in accordance with aspects of this disclosure.

FIG. 3 illustrates an example sparse matrix of performance data used to perform collaborative filtering, in accordance with aspects of this disclosure. FIG. 3 is described with respect to FIG. 2. To perform collaborative filtering, one or more processors 240 of computing system 250 may execute gaming performance module 262 to use performance data collected across a variety of gaming applications and a variety of computing devices. That is, gaming performance module 262 may use performance data of a variety of gaming applications executing on a variety of computing devices to determine a predicted performance of a specific gaming application executing at a specific computing device.

The performance data collected across a variety of gaming applications and a variety of computing devices may include performance data derived from performing performance tests and experiments on a variety of gaming applications and computing devices in a lab setting. The performance data may also include performance data derived from usage of gaming applications and computing devices in real world settings. In some examples, the performance data may also include performance data specified by developers of one or more of the gaming applications.

The data that is determined across a variety of gaming applications and a variety of computing devices may be in different forms of measurements and may not be directly comparable. For example, data determined from a gaming application executing at a computing device may be the number of milliseconds to perform a task (e.g., to render a frame) while data determined from a gaming application executing at a different computing device may be the average frame rendering time. In addition, the data that is collected may include discrete values (e.g., the amount of RAM) and/or binary values (e.g., whether a device supports OpenGL 3.1).

As such, in some examples, performance data that is collected may be scaled, such as to [0, 1] or [−1, 1] intervals, and discrete data that is collected can be encoded to generate performance data that is normalized, and such normalized performance data determined from different gaming applications and/or different computing devices can be directly comparable. Such scaling may include linear scaling, logarithmic scaling, exponential scaling, and the like. In this way, gaming performance module 262 may perform collaborative filtering using performance data that is normalized so that performance data determined from different gaming applications and/or different computing devices can be directly compared.

As shown in FIG. 3, matrix 380 is a sparse matrix that represents performance data that have been normalized (e.g., scaled and/or encoded to range from 0 to 1). Rows 304A-304P ("rows 384") of matrix 380 represent computing devices. Matrix 380 may specify, for the computing devices represented by rows 384, benchmark data 381 and gaming performance data 383.

The gaming performance data 383 portion of matrix 380 includes columns 306A-306H ("columns 386") that represent gaming applications and/or gaming sections of gaming applications. Thus, a cell at a given row of rows 384 and a given column of columns 386 represents the performance data of the gaming application or a gaming section of the gaming application represented by the given column of columns 386 executing at the computing device represented by the given row of rows 384.

The benchmark data 381 portion of matrix 380 includes columns 308A-308C ("columns 388") of matrix 380 that represent benchmarks of the computing devices represented by rows 384. Column 388A may represent CPU performance benchmarks of the computing devices represented by rows 384, column 388B may represent GPU performance benchmarks of the computing devices represented by rows 384, and column 388C may represent memory benchmarks of the computing devices represented by rows 384.

Each cell in matrix 380 intersected by a particular column of columns 388 and a particular row of rows 384 may represent benchmark scores of a computing device represented by the particular row of rows 384 for the benchmark represented by the particular column of columns 388. For example, a cell at a given row of rows 384 and column 388A may represent the CPU performance benchmark score of the computing device represented by the given row of rows 384.

Matrix 380 is a sparse matrix because matrix 380 may include performance data for fewer than all possible computing device/gaming application combinations of matrix 380, and may include benchmark data for fewer than all computing device/benchmark combinations of matrix 380. The cells of matrix 380 for which there is performance data or benchmark data are illustrated in FIG. 3 as having a pattern, which may denote a performance score or a benchmark score between 0 and 1. The cells of matrix 380 for which there is no data for the particular computing device/gaming application combinations or for the particular computing device/benchmark combination are denoted with "?" in matrix 380 shown in FIG. 3.

More formally, given M gaming applications and N computing devices, $r_{gd}$ can be defined as the quality of gaming application g executing at computing device d, where the quality of a gaming application executing a computing device may correspond to or be the same as a performance score. Similarly, $b_{id}$ can be defined as the quality of benchmark i on computing device d, where the quality of benchmark i may correspond to or be the same as a benchmark score. As shown in matrix 380, $r_{gd}$ is sparse in both g and d. That is, matrix 380 may only have performance data for certain device/game combinations. Similarly, $b_{id}$ is sparse in both i and d, as matrix 380 may only have full benchmark data for certain devices.

Matrix 380 may have full benchmark data for each device that is benchmarked. In the example of FIG. 3, rows 304K-304P represent computing devices that have been benchmarked. As can be seen, because each of the computing devices represented by rows 304K-304P have been benchmarked, cells in rows 304K-304P that intersect with columns 388 all have benchmark data.

Gaming performance module 262 may use a sparse matrix, such as matrix 380, that contains performance data of gaming application/computing device combinations to estimate the performance data of a specific gaming application executing on a specific computing device. That is, gaming performance module 262 may, for a cells of matrix 380 for which there is no performance data for the particular computing device/gaming application combination, be able to estimate the performance data for the particular computing device/gaming application combination based on the known performance data of gaming application/computing device combinations in matrix 380.

In some examples, gaming performance module 262 may execute at one or more processors 240 to perform memory-based collaborative filtering to determine a predicted performance of a gaming application executing at a computing device. Gaming performance module 262 may, for a first gaming application that executes on a computing device, estimate the performance data for a particular computing device and gaming application combination based on determining a second gaming application that performs most similarly to the first gaming application across a variety of different computing devices. To determine the second gaming application that performs most similarly to the first gaming application, gaming performance module 262 may execute to aggregate the performance of each of a plurality of gaming application having known performance data in matrix 380 across a variety of computing devices to determine an aggregate performance of each gaming application, such as by taking an average of the performance, a median of the performance, a specified percentile of the performance, and the like. In some examples, the performance of a gaming application may be the performance of one or more gaming sections of the gaming application (e.g., a subset of all of the gaming sections of the gaming application) across a variety of computing devices.

Gaming performance module 262 may execute to compare the aggregate of the performance of the first gaming application against the aggregate of the performance for each of a plurality of gaming applications using any suitable technique. In some examples, gaming performance module 262 may execute to compare the aggregate of the performance of the first gaming application against the aggregate of the performance for each of a plurality of gaming applications by determining the Euclidean distance between aggregate performances, a Pearson correlation coefficient, k-nearest neighbors clustering, and/or locality-sensitive hashing. Gaming performance module 262 may therefore execute to determine, out of the plurality of gaming applications, a second application having an aggregate performance that is most similar to the aggregate performance of the first application as the second gaming application that performs most similarly to the first gaming application across a variety of different computing devices.

Gaming performance module 262 may execute to, in response to determining a second gaming application that performs most similarly to the first gaming application across a variety of different computing devices, determine a performance score for the first application executing at computing device based on the performance score for the second application executing at a second computing device that corresponds to the computing device. The second computing device may correspond to the computing device by being of the same brand and model as the computing device, and may also have the same number of CPUs and/or GPUs, the same amount of memory, have CPUs and/or GPUs that operate at the same operating frequency as the computing device, as the like.

In the example of FIG. 3, gaming performance module 262 may execute to determine a performance score for the gaming application represented by column 386 executing on the computing device that corresponds to the computing device represented by row 384A, where the performance score is denoted as "?" in cell 385A of matrix 380 because the performance score for the gaming application represented by column 386 executing on the computing device that corresponds to the computing device represented by row 384A is unknown. Gaming performance module 262 may execute to determine, out of the gaming applications represented by columns 306B-306H, that the gaming application having an aggregate performance across the computing devices represented by rows 304B-304P that is most similar to the aggregate performance of the gaming application represented by column 386 across the computing devices represented by rows 304B-304P is the gaming application represented by column 386C.

Gaming performance module 262 may therefore execute to determine a performance score for the gaming application represented by column 386 executing on the computing device represented by row 384A based on the performance score, which is in cell 385B, for the gaming application represented by column 386C executing on the computing device represented by row 384A. As can be seen in matrix 380, cell 385B indicates that the performance score for the gaming application represented by column 386C executing on the computing device represented by row 384A has a value of 0.8. As such, in some examples, gaming performance module 262 may execute to determine a performance score for the gaming application represented by column 386 executing on the computing device represented by row 384A based on the performance score for the gaming application represented by column 386C executing on the computing device represented by row 384A by setting the performance score for the gaming application represented by column 386 executing on the computing device represented by row 384A to the performance score of 0.8 of for the gaming application represented by column 386C executing on the computing device represented by row 384A.

In some examples, instead of determining a second gaming application that performs most similarly to the first gaming application across a variety of different computing devices, gaming performance module 262 may, in order to determine the performance data for a combination of a gaming application and a particular computing device, execute to determine another computing device that performs most similarly to the particular computing device when executing a variety of different gaming applications. That is, gaming performance module 262 may execute to, for a gaming application that executes on a first computing device, estimate the performance data for the gaming application executing on the first computing device based on determining a second computing device that performs most similarly to the first computing device across a variety of different gaming applications.

To determine the second computing device that performs most similarly to the first computing device, gaming performance module 262 may execute to aggregate the performance of each computing device across a variety of gaming applications, such as by taking an average of the performance, a median of the performance, a specified percentile of the performance, and the like. Gaming performance module 262 may therefore execute to compare the aggregate of the performance of the first computing device against the aggregate of the performance for each of a plurality of computing devices.

In some examples, gaming performance module 262 may execute to compare the aggregate of the performance of the first computing device against the aggregate of the performance for each of a plurality of computing devices by determining the Euclidean distance between aggregate performances, a Pearson correlation coefficient, k-nearest neighbors clustering, and/or locality-sensitive hashing. Gaming performance module 262 may therefore execute to determine, out of the plurality of computing devices, a second computing device having an aggregate performance that is most similar to the aggregate performance of the first computing device as the second computing device that performs most similarly to the first computing device across a variety of different gaming applications.

Gaming performance module 262 may execute to, in response to determining a second computing device that performs most similarly to the first computing device across a variety of different gaming applications, determine a performance score for the gaming application executing at the first computing device based on the performance score for the same gaming application executing at the second computing device. In the example of FIG. 3, gaming performance module 262 may execute to determine a performance score for the gaming application represented by column 386 executing on the computing device represented by row 384A, where the performance score is denoted as "?" in cell 385A of matrix 380 because the performance score for the gaming application represented by column 386 executing on the computing device represented by row 384A is unknown. Gaming performance module 262 may execute to determine, out of the computing devices represented by rows 304B-304P, that the computing device having an aggregate performance across the gaming applications represented by rows 306B-306H most similar to that of the computing device represented by row 384A is the computing device represented by row 384M.

Gaming performance module 262 may therefore execute to determine a performance score for the gaming application represented by column 386 executing on the computing device represented by row 384A based on the performance score, which is in cell 385C, for the gaming application represented by column 386 executing on the computing device represented by row 384M. As can be seen in matrix 380, cell 385C indicates that the performance score for the gaming application represented by column 386 executing on the computing device represented by row 384M is 0.75. As such, in some examples, gaming performance module 262 may execute to determine a performance score for the gaming application represented by column 386 executing on the computing device represented by row 384A based on the performance score for the same gaming application represented by column 386A executing on the computing device represented by row 384M by setting the performance score for the gaming application represented by column 386A executing on the computing device represented by row 384A to the performance score of 0.75 for the same gaming application represented by column 386A executing on the computing device represented by row 384M.

In some examples, aspects of this disclosure include using one or more neural networks trained using machine learning to determine performance data for a gaming application executing at a computing device. In the example of FIG. 2, gaming performance module 262 includes gaming performance model 264 that includes one or more neural networks trained to receive an indication of a gaming application and a computing device and to determine a performance score of the gaming application executing at the computing device. The one or more neural networks of gaming performance model 264 may be trained using performance data of a variety of different gaming applications executing on a variety of different computing devices. The performance data may include, for each of a plurality of different gaming applications, the performance score of each gaming application on a variety of different computing devices, such as illustrated by sparse matrix 380. In some examples, the performance data may also include, for each of a plurality of computing devices, one or more benchmark scores, such as one or more of a GPU performance score, a CPU performance score, and/or a memory performance score, such as illustrated in matrix 380.

The training data to train the one or more neural networks of gaming performance model 264 may therefore include, for each of a plurality of combinations of gaming applications and computing devices, an indication of a computing device, an indication of a gaming application, and a performance score of the gaming application executing at the computing device. The indication of a computing device may include one or more features of the computing device, which may include any combination of the brand of the computing device, a the model of the computing device, an amount of memory of the computing device, the number of CPUs and/or the number of processing cores of the one or more CPUs, the number of GPUs and/or the number of processing cores of the one or more GPUs, the operating frequencies of the one or more CPUs and/or one or more GPUs, and the like. In some examples, the one or more features of a computing device may also include one or more benchmark scores, such as one or more of a GPU performance score, a CPU performance score, and/or a memory performance score. The indication of a gaming application may include any combination of a software package name, a software package version number, one or more fidelity parameters, the like. The one or more features of a computing device and the one or more features of a gaming application may each be in the form of a vector embedding.

More formally, each computing device and each gaming application may have a set of K features, and the one or more neural networks of gaming performance model 264 may be trained to tune those features in order to fit the data. Specifically, given feature vector $$x_k^g$$

for feature k for gaming application g and feature vector $$\Theta_k^d$$

for feature k for computing device d, the one or more neural networks of gaming performance model 264 may be trained to determine, for gaming application g executing at computing device d, a predicted quality $q_{gd}$, such as a predicted performance score. The predicted quality $q_{gd}$ for gaming application g executing at computing device d is a function of $$x_k^g \text{ and } \Theta_k^d,$$

and can be formally expressed as:

$$q_{gd} = F(x_k^g, \Theta_k^d) \tag{1}$$

The one or more neural networks of gaming performance model 264 may be trained, given quality $q_{gd}$, to minimize a loss function to minimize the difference (e.g., the root mean squared error) between the predicted quality and the actual quality for known quality data points, which can be expressed as follows:

$$\frac{1}{2}\sum_{(g,d)\in E} \left(F(x_k^g, \Theta_k^d) - r_{gd}\right)^2 + \sum_g \frac{\lambda}{2}|x^g|^2 + \sum_d \frac{\lambda}{2}|\Theta^d|^2 \tag{2}$$

where E is the set of gaming application/computing device pairs having known quality data points and λ is a hyperparameter that controls regularization (i.e., how much to underfit or overfit the data). Examples of hyperparameters may include any combination of embedding layer sizes, dense layer sizes, learning rate, regularization parameter, and/or the number of epochs.

Equation (2) may be solved using techniques such as stochastic gradient descent. To avoid overfitting of data, the one or more neural networks of gaming performance model 264 may be trained using L1 and/or L2 regularization techniques and early stopping. As such, given a known performance score of a gaming application g executing at computing device d, which is provided as training data, the one or more neural networks of gaming performance model 264 may be trained to determine a predicted performance score of the gaming application g executing at computing device d and to minimize the difference between the predicted performance score and the known performance score.

The functional form of $$F(x_k^g, \Theta_k^d)$$

in equation (1) and equation (2) may be implemented as a single or multilayer neural network, or may be implemented as a simple linear function:

$$F(x_k^g, \Theta_k^d) \leftarrow \sum_k \Theta_k^d x_k^g$$

In this case, the solution to the minimization may be similar to calculating the singular value decomposition (SVD) of $r_{gd}$.

If a computing device is not well tuned for a given gaming application, such as when a developer-assigned quality level for the given gaming application executing at the computing device is incorrect, the one or more neural networks of gaming performance model 264 may be trained by applying an inequality constraint in the minimization, such as $q_{gd}<r_{gd}$ or $q_{gd}>r_{gd}$ instead of fitting to a quality level $r_{gd}$. In some examples, because performance data (e.g., the per-device frame rate data) is gathered from a set of real-world computing devices, such data may be noisy. To deal with noise in such data, the one or more neural networks of gaming performance model 264 may be trained to weigh each point in the sum in the first term of equation (2) (i.e., $\Sigma_{\{g,d\}\in E}$ $$\left(F(x_k^g, \Theta_k^d) - r_{gd}\right)^2\Big)$$

by the inverse error. In some examples, the one or more neural networks of gaming performance model 264 may be trained by obtaining a measure of the uncertainty of the fitted values using a Monte-Carlo approach: optimize the parameters from different random initial conditions and determine how the individual fitted values vary. In some examples, the one or more neural networks of gaming performance model 264 may be trained to perform device bucketing, such as using a nearest-neighbor clustering algorithm (e.g., K-means clustering) on the computing device feature vectors $$\theta_k^d.$$

In some examples, the one or more neural networks of gaming performance model 264 may be trained using benchmark data (e.g., benchmark scores) for computing devices as device vectors as a replacement for or in addition to the device features discussed above. Given that $b_{kd}$ are the features for a computing device d, the feature vector $$\Theta_k^d$$

for a computing device d can be replaced with $b_{kd}$, such that $$\Theta_k^d = b_{kd}$$

for device d in the set of computing devices that have known benchmark data. The one or more neural networks of gaming performance model 264 may be trained to minimize over $$x_k^g$$

in order to determine the features for each gaming application which have been executed on the computing device d. The one or more neural networks of gaming performance model 264 may be trained by imputing the features (e.g., benchmark data) for computing devices that do not have benchmark scores but may have executed an overlapping set of gaming applications as the computing devices having benchmark scores.

The result of training the one or more neural networks of gaming performance model 264 may be one or more neural networks that combine input embeddings indicating gaming applications and computing devices via sequential fully connected neural network layers. The input embeddings may include individual vectors for each gaming application and/or computing device with an embedding layer on top, or the gaming applications and computing devices may be segmented, with concatenated embedding and normalization layers on top. The one or more neural networks of gaming performance model 264 may include one or more dense layers on top of the input embeddings, such as one or more rectified linear unit (ReLU) activation layers and/or one or more sigmoid layers. The one or more neural networks of gaming performance model 264 may also include, on top of the intermediate layer, another dense layer with a single linear output that outputs the predicted performance score.

Once the initial training of the one or more neural networks of gaming performance model 264 is finished, the one or more neural networks of gaming performance model 264 may be evaluated against a held-out data set containing combinations of gaming applications and computing devices with known performance scores to determine the accuracy of the predicted performance scores generated by the one or more neural networks of gaming performance model 264. Based on the evaluation of the one or more neural networks, one or more hyperparameters of the one or more neural networks of gaming performance model 264, such as layer sizes and configuration, may be adjusted to improve the accuracy of the one or more neural networks.

FIGS. 4A through 4E are conceptual diagrams illustrating aspects of an example machine-learned model according to example implementations of the present disclosure. FIGS. 4A through 4E are described below in the context of gaming performance model 264. For example, in some instances, machine-learned model 422, as referenced below, may be an example of gaming performance model 264.

Figure 4A:
FIGS. 4A-4E are conceptual diagrams illustrating aspects of an example machine-learned model according to example implementations of the present disclosure.

FIG. 4A depicts a conceptual diagram of an example machine-learned model according to example implementations of the present disclosure. As illustrated in FIG. 4A, in some implementations, machine-learned model 422 is trained to receive input data of one or more types and, in response, provide output data of one or more types. Thus, FIG. 4A illustrates machine-learned model 422 performing inference.

The input data may include one or more features that are associated with an instance or an example. In some implementations, the one or more features associated with the instance or the example can be organized into a feature vector. For example, gaming performance model 264 may receive a feature vector that includes one or more features of a gaming application and a feature vector that includes one or more features of a computing device. In some implementations, the output data can include one or more predictions. Predictions can also be referred to as inferences. Thus, given features associated with a particular instance, machine-learned model 422 can output a prediction for such instance based on the features. For example, given a feature vector that includes one or more features of a gaming application and a feature vector that includes one or more features of a computing device, gaming performance model 264 may output a predicted performance of the gaming application executing at the computing device.

Machine-learned model 422 can be or include one or more of various different types of machine-learned models. In particular, in some implementations, machine-learned model 422 can perform classification, regression, clustering, anomaly detection, recommendation generation, and/or other tasks.

In some implementations, machine-learned model 422 can perform various types of classification based on the input data. For example, machine-learned model 422 can perform binary classification or multiclass classification. In binary classification, the output data can include a classification of the input data into one of two different classes. In multiclass classification, the output data can include a classification of the input data into one (or more) of more than two classes. The classifications can be single label or multi-label. Machine-learned model 422 may perform discrete categorical classification in which the input data is simply classified into one or more classes or categories.

In some implementations, machine-learned model 422 can perform regression to provide output data in the form of a continuous numeric value. The continuous numeric value can correspond to any number of different metrics or numeric representations, including, for example, currency values, scores (e.g., performance scores), or other numeric representations. As examples, machine-learned model 422 can perform linear regression, polynomial regression, or nonlinear regression. As examples, machine-learned model 422 can perform simple regression or multiple regression. As described above, in some implementations, a Softmax function or other function or layer can be used to squash a set of real values respectively associated with two or more possible classes to a set of real values in the range (0, 1) that sum to one.

Machine-learned model 422 may perform various types of clustering. For example, machine-learned model 422 can identify one or more previously-defined clusters to which the input data most likely corresponds. Machine-learned model 422 may identify one or more clusters within the input data. That is, in instances in which the input data includes multiple objects, documents, or other entities, machine-learned model 422 can sort the multiple entities included in the input data into a number of clusters. In some implementations in which machine-learned model 422 performs clustering, machine-learned model 422 can be trained using unsupervised learning techniques.

Machine-learned model 422 may perform anomaly detection or outlier detection. For example, machine-learned model 422 can identify input data that does not conform to an expected pattern or other characteristic (e.g., as previously observed from previous input data). As examples, the anomaly detection can be used for fraud detection or system failure detection.

In some implementations, machine-learned model 422 can provide output data in the form of one or more recommendations. For example, machine-learned model 422 can be included in a recommendation system or engine. As an example, given input data that describes previous outcomes for certain entities (e.g., a score, ranking, or rating indicative of an amount of success or enjoyment), machine-learned model 422 can output a suggestion or recommendation of one or more additional entities that, based on the previous outcomes, are expected to have a desired outcome (e.g., elicit a score, ranking, or rating indicative of success or enjoyment).

In some implementations, machine-learned model 422 can be a parametric model while, in other implementations, machine-learned model 422 can be a non-parametric model. In some implementations, machine-learned model 422 can be a linear model while, in other implementations, machine-learned model 422 can be a non-linear model.

As described above, machine-learned model 422 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine-learned model 422 can be or include one or more classifier models such as, for example, linear classification models; quadratic classification models; etc. Machine-learned model 422 may be or include one or more regression models such as, for example, simple linear regression models; multiple linear regression models; logistic regression models; stepwise regression models; multivariate adaptive regression splines; locally estimated scatterplot smoothing models; etc.

In some examples, machine-learned model 422 can be or include one or more decision tree-based models such as, for example, classification and/or regression trees; iterative dichotomiser 3 decision trees; C4.5 decision trees; chi-squared automatic interaction detection decision trees; decision stumps; conditional decision trees; etc.

Machine-learned model 422 may be or include one or more kernel machines. In some implementations, machine-learned model 422 can be or include one or more support vector machines. Machine-learned model 422 may be or include one or more instance-based learning models such as, for example, learning vector quantization models; self-organizing map models; locally weighted learning models; etc. In some implementations, machine-learned model 422 can be or include one or more nearest neighbor models such as, for example, k-nearest neighbor classifications models; k-nearest neighbors regression models; etc. Machine-learned model 422 can be or include one or more Bayesian models such as, for example, naïve Bayes models; Gaussian naïve Bayes models; multinomial naïve Bayes models; averaged one-dependence estimators; Bayesian networks; Bayesian belief networks; hidden Markov models; etc.

In some implementations, machine-learned model 422 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as “deep” networks. A deep network can include an input layer, an output layer, and one or more hidden layers positioned between the input layer and the output layer. The nodes of the neural network can be connected or non-fully connected.

Machine-learned model 422 can be or include one or more feed forward neural networks. In feed forward networks, the connections between nodes do not form a cycle. For example, each connection can connect a node from an earlier layer to a node from a later layer.

In some instances, machine-learned model 422 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine-learned model 422 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine-learned model 422 can be or include one or more generative networks such as, for example, generative adversarial networks. Generative networks can be used to generate new data such as new images or other content.

Machine-learned model 422 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and to provide output data that reconstructs the input data from the encoding. Recently, the autoencoder concept has become more widely used for learning generative models of data. In some instances, the autoencoder can include additional losses beyond reconstructing the input data.

Machine-learned model 422 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings may be useful inputs for downstream models. For example, embeddings can be useful to generalize input data (e.g., search queries) for a downstream model or processing system.

Machine-learned model 422 may include one or more clustering models such as, for example, k-means clustering models; k-medians clustering models; expectation maximization models; hierarchical clustering models; etc.

In some implementations, machine-learned model 422 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine-learned model 422 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine-learned model 422 can be an autoregressive model. In some instances, an autoregressive model can specify that the output data depends linearly on its own previous values and on a stochastic term. In some instances, an autoregressive model can take the form of a stochastic difference equation. One example of an autoregressive model is WaveNet, which is a generative model for raw audio.

In some implementations, machine-learned model 422 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example of ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine-learned model 422 can be used to preprocess the input data for subsequent input into another model. For example, machine-learned model 422 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine-learned model 422 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine-learned model 422 can receive and use the input data in its raw form. In some implementations, the raw input data can be preprocessed. Thus, in addition or alternatively to the raw input data, machine-learned model 422 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example preprocessing technique, portions of the input data can be imputed. For example, additional synthetic input data can be generated through interpolation and/or extrapolation.

As another example preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine-learned model 422. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color, shade, or hue; magnification; segmentation; amplification; etc.

In response to receipt of the input data, machine-learned model 422 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to output a predicted performance score based on the features of a gaming application and of a computing device. Any of the different types or forms of input data described above can be combined with any of the different types or forms of machine-learned models described above to provide any of the different types or forms of output data described above.

The systems and methods of the present disclosure can be implemented by or otherwise executed on one or more computing devices, such as computing system 150 and computing system 250. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); server computing devices (e.g., database servers, parameter servers, file servers, mail servers, print servers, web servers, game servers, application servers, etc.); dedicated, specialized model processing or training devices; virtual computing devices; other computing devices or computing infrastructure; or combinations thereof.

Figure 4B:
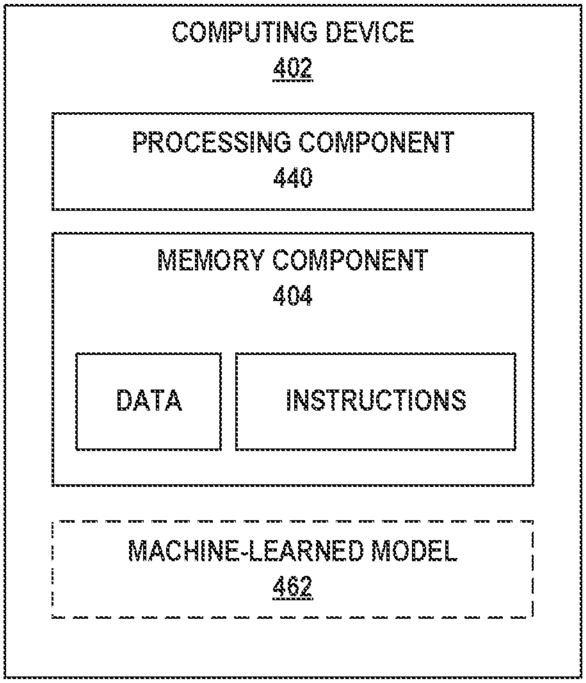

FIG. 4B illustrates a conceptual diagram of computing device 402, which is an example of computing device 102 of FIG. 1. Computing device 402 includes processing component 440, memory component 404 and machine-learned model 422. Computing device 402 may store and implement machine-learned model 422 locally (i.e., on-device). Thus, in some implementations, machine-learned model 422 can be stored at and/or implemented locally by an embedded device or a user computing device such as a mobile device. Output data obtained through local implementation of machine-learned model 422 at the embedded device or the user computing device can be used to improve performance of the embedded device or the user computing device (e.g., an application implemented by the embedded device or the user computing device).

Figure 4C:
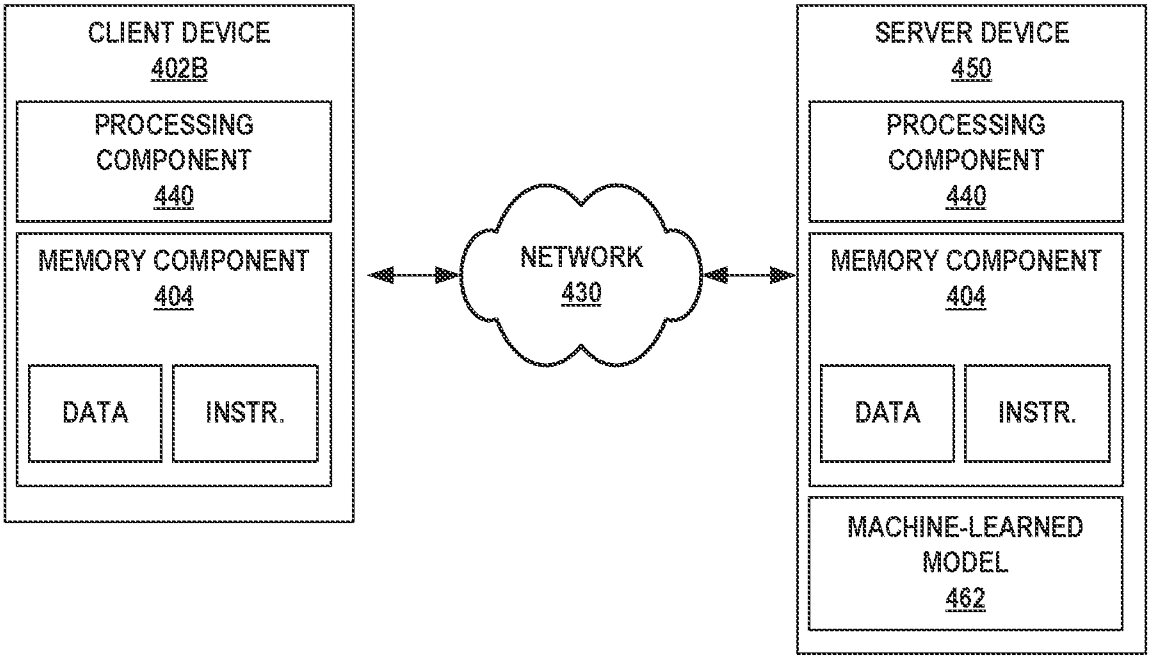

FIG. 4C illustrates a conceptual diagram of an example client computing device that can communicate over a network with an example server computing system that includes a machine-learned model. FIG. 4C includes client device 402A communicating with server device 450 over network 430. Client device 402A is an example of computing device 102 of FIG. 1, server device 450 is an example of computing system 150 of FIG. 1 and computing system 250 of FIG. 2, and network 430 is an example of network 130 of FIG. 1. Server device 450 stores and implements machine-learned model 422. In some instances, output data obtained through machine-learned model 422 at server device 450 can be used to improve other server tasks or can be used by other non-user devices to improve services performed by or for such other non-user devices. For example, the output data can improve other downstream processes performed by server device 450 for a computing device of a user or embedded computing device. In other instances, output data obtained through implementation of machine-learned model 422 at server device 450 can be sent to and used by a user computing device, an embedded computing device, or some other client device, such as client device 402A. For example, server device 450 can be said to perform machine learning as a service.

In yet other implementations, different respective portions of machine-learned model 422 can be stored at and/or implemented by some combination of a user computing device; an embedded computing device; a server computing device; etc. In other words, portions of machine-learned model 422 may be distributed in whole or in part amongst client device 402A and server device 450.

Devices 402A and 450 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. Devices 402A and 450 may be distributed at different physical locations and connected via one or more networks, including network 430. If configured as distributed computing devices, Devices 402A and 450 may operate according to sequential computing architectures, parallel computing architectures, or combinations thereof. In one example, distributed computing devices can be controlled or guided through use of a parameter server.

In some implementations, multiple instances of machine-learned model 422 can be parallelized to provide increased processing throughput. For example, the multiple instances of machine-learned model 422 can be parallelized on a single processing device or computing device or parallelized across multiple processing devices or computing devices.

Each computing device that implements machine-learned model 422 or other aspects of the present disclosure can include a number of hardware components that enable performance of the techniques described herein. For example, each computing device can include one or more memory devices that store some or all of machine-learned model 422. For example, machine-learned model 422 can be a structured numerical representation that is stored in memory. The one or more memory devices can also include instructions for implementing machine-learned model 422 or performing other operations. Example memory devices include RAM, ROM, EEPROM, EPROM, flash memory devices, magnetic disks, etc., and combinations thereof.

Each computing device can also include one or more processing devices that implement some or all of machine-learned model 422 and/or perform other related operations. Example processing devices include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing devices can be embedded within other hardware components such as, for example, an image sensor, accelerometer, etc.

Hardware components (e.g., memory devices and/or processing devices) can be spread across multiple physically distributed computing devices and/or virtually distributed computing systems.

Figure 4D:
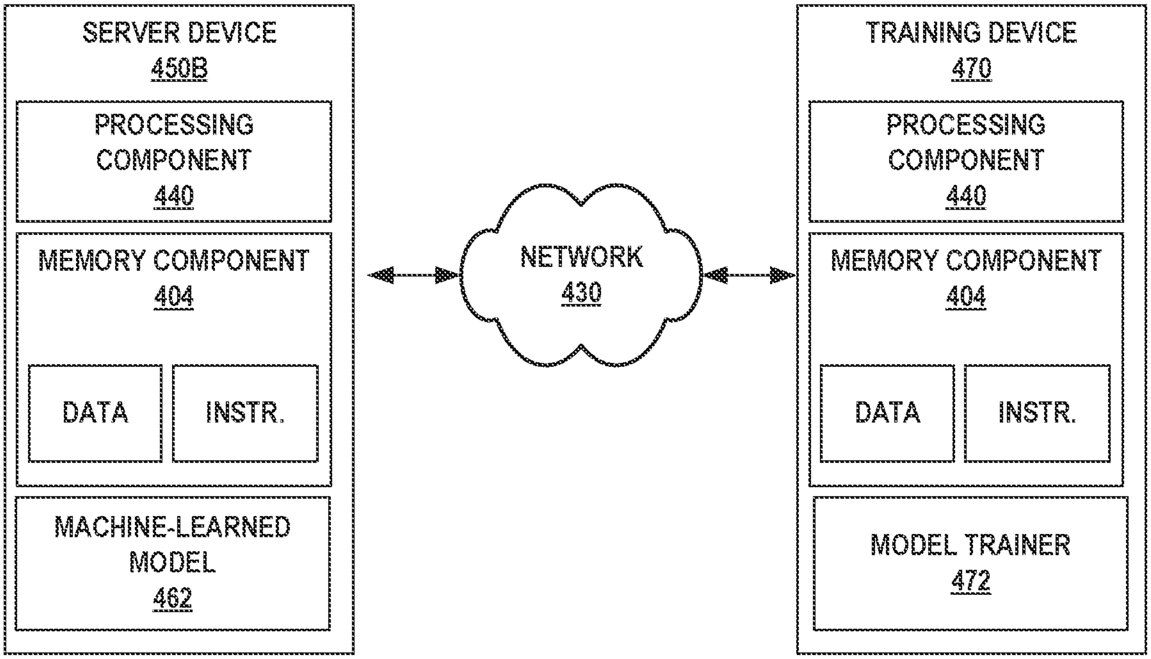

FIG. 4D illustrates a conceptual diagram of an example computing device in communication with an example training computing system that includes a model trainer. FIG. 4D includes server device 450B communicating with training device 470 over network 430. Server device 450B is an example of computing system 150 of FIG. 1 and network 430 is an example of network 130 of FIG. 1. Machine-learned model 422 described herein can be trained at a training computing system, such as training device 470, and then provided for storage and/or implementation at one or more computing devices, such as server device 450B. For example, model trainer 472 executes locally at training device 470. However in some examples, training device 470, including model trainer 472, can be included in or separate from server device 450B or any other computing device that implements machine-learned model 422.

In some implementations, machine-learned model 422 may be trained in an offline fashion or an online fashion. In offline training (also known as batch learning), machine-learned model 422 is trained on the entirety of a static set of training data. In online learning, machine-learned model 422 is continuously trained (or re-trained) as new training data becomes available (e.g., while the model is used to perform inference).

Model trainer 472 may perform centralized training of machine-learned model 422 (e.g., based on a centrally stored dataset). In other implementations, decentralized training techniques such as distributed training, federated learning, or the like can be used to train, update, or personalize machine-learned model 422.

Machine-learned model 422 described herein can be trained according to one or more of various different training types or techniques. For example, in some implementations, machine-learned model 422 can be trained by model trainer 472 using supervised learning, in which machine-learned model 422 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the user computing device. In some implementations, this process can be referred to as personalizing the model.

Figure 4E:
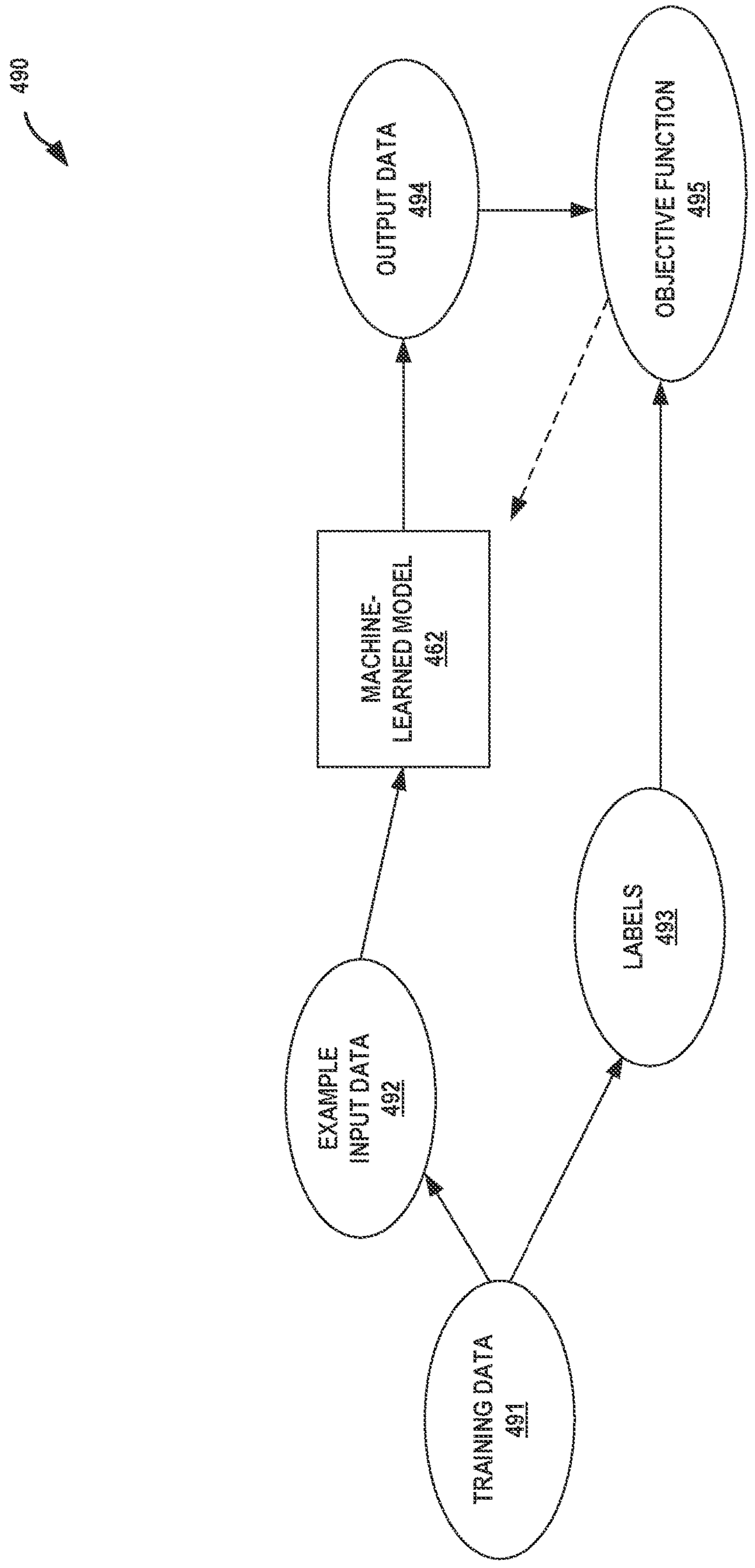

FIG. 4E illustrates a conceptual diagram of training process 490 which is an example training process in which machine-learned model 422 is trained on training data 491 that includes example input data 492 that has labels 493. Training processes 490 is one example training process; other training processes may be used as well.

Training data 491 used by training process 490 can include, upon user permission for use of such data for training, anonymized usage logs of sharing flows, e.g., content items that were shared together, bundled content pieces already identified as belonging together, e.g., from entities in a knowledge graph, etc. In some implementations, training data 491 can include examples of input data 492 that have been assigned labels 493 that correspond to output data 494.

In some implementations, machine-learned model 422 can be trained by optimizing an objective function, such as objective function 495. For example, in some implementations, objective function 495 may be or include a loss function that compares (e.g., determines a difference between) output data generated by the model from the training data and labels (e.g., ground-truth labels) associated with the training data. For example, the loss function can evaluate a sum or mean of squared differences between the output data and the labels. In some examples, objective function 495 may be or include a cost function that describes a cost of a certain outcome or output data. Other examples of objective function 495 can include margin-based techniques such as, for example, triplet loss or maximum-margin training.

One or more of various optimization techniques can be performed to optimize objective function 495. For example, the optimization technique(s) can minimize or maximize objective function 495. Example optimization techniques include Hessian-based techniques and gradient-based techniques, such as, for example, coordinate descent; gradient descent (e.g., stochastic gradient descent); subgradient methods; etc. Other optimization techniques include black box optimization techniques and heuristics.

In some implementations, backward propagation of errors can be used in conjunction with an optimization technique (e.g., gradient based techniques) to train machine-learned model 422 (e.g., when machine-learned model is a multi-layer model such as an artificial neural network). For example, an iterative cycle of propagation and model parameter (e.g., weights) update can be performed to train machine-learned model 422. Example backpropagation techniques include truncated backpropagation through time, Levenberg-Marquardt backpropagation, etc.

In some implementations, machine-learned model 422 described herein can be trained using unsupervised learning techniques. Unsupervised learning can include inferring a function to describe hidden structure from unlabeled data. For example, a classification or categorization may not be included in the data. Unsupervised learning techniques can be used to produce machine-learned models capable of performing clustering, anomaly detection, learning latent variable models, or other tasks.

Machine-learned model 422 can be trained using semi-supervised techniques which combine aspects of supervised learning and unsupervised learning. Machine-learned model 422 can be trained or otherwise generated through evolutionary techniques or genetic algorithms. In some implementations, machine-learned model 422 described herein can be trained using reinforcement learning. In reinforcement learning, an agent (e.g., model) can take actions in an environment and learn to maximize rewards and/or minimize penalties that result from such actions. Reinforcement learning can differ from the supervised learning problem in that correct input/output pairs are not presented, nor sub-optimal actions explicitly corrected.

In some implementations, one or more generalization techniques can be performed during training to improve the generalization of machine-learned model 422. Generalization techniques can help reduce overfitting of machine-learned model 422 to the training data. Example generalization techniques include dropout techniques; weight decay techniques; batch normalization; early stopping; subset selection; stepwise selection; etc.

In some implementations, machine-learned model 422 described herein can include or otherwise be impacted by a number of hyperparameters, such as, for example, learning rate, number of layers, number of nodes in each layer, number of leaves in a tree, number of clusters; etc. Hyperparameters can affect model performance. Hyperparameters can be hand selected or can be automatically selected through application of techniques such as, for example, grid search; black box optimization techniques (e.g., Bayesian optimization, random search, etc.); gradient-based optimization; etc. Example techniques and/or tools for performing automatic hyperparameter optimization include Hyperopt; Auto-WEKA; Spearmint; Metric Optimization Engine (MOE); etc.

In some implementations, various techniques can be used to optimize and/or adapt the learning rate when the model is trained. Example techniques and/or tools for performing learning rate optimization or adaptation include Adagrad; Adaptive Moment Estimation (ADAM); Adadelta; RMSprop; etc.

In some implementations, transfer learning techniques can be used to provide an initial model from which to begin training of machine-learned model 422 described herein.

In some implementations, machine-learned model 422 described herein can be included in different portions of computer-readable code on a computing device. In one example, machine-learned model 422 can be included in a particular application or program and used (e.g., exclusively) by such a particular application or program. Thus, in one example, a computing device can include a number of applications and one or more of such applications can contain its own respective machine learning library and machine-learned model(s).

In another example, machine-learned model 422 described herein can be included in an operating system of a computing device (e.g., in a central intelligence layer of an operating system) and can be called or otherwise used by one or more applications that interact with the operating system. In some implementations, each application can communicate with the central intelligence layer (and model(s) stored therein) using an application programming interface (API) (e.g., a common, public API across all applications).

In some implementations, the central intelligence layer can communicate with a central device data layer. The central device data layer can be a centralized repository of data for the computing device. The central device data layer can communicate with a number of other components of the computing device, such as, for example, one or more sensors, a context manager, a device state component, and/or additional components. In some implementations, the central device data layer can communicate with each device component using an API (e.g., a private API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination.

Databases and applications can be implemented on a single system or distributed across multiple systems. Distributed components can operate sequentially or in parallel.

In addition, the machine learning techniques described herein are readily interchangeable and combinable. Although certain example techniques have been described, many others exist and can be used in conjunction with aspects of the present disclosure.

A brief overview of example machine-learned models and associated techniques has been provided by the present disclosure. For additional details, readers should review the following references: Machine Learning A Probabilistic Perspective (Murphy); Rules of Machine Learning: Best Practices for ML Engineering (Zinkevich); Deep Learning (Goodfellow); Reinforcement Learning: An Introduction (Sutton); and Artificial Intelligence: A Modern Approach (Norvig).

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 5:
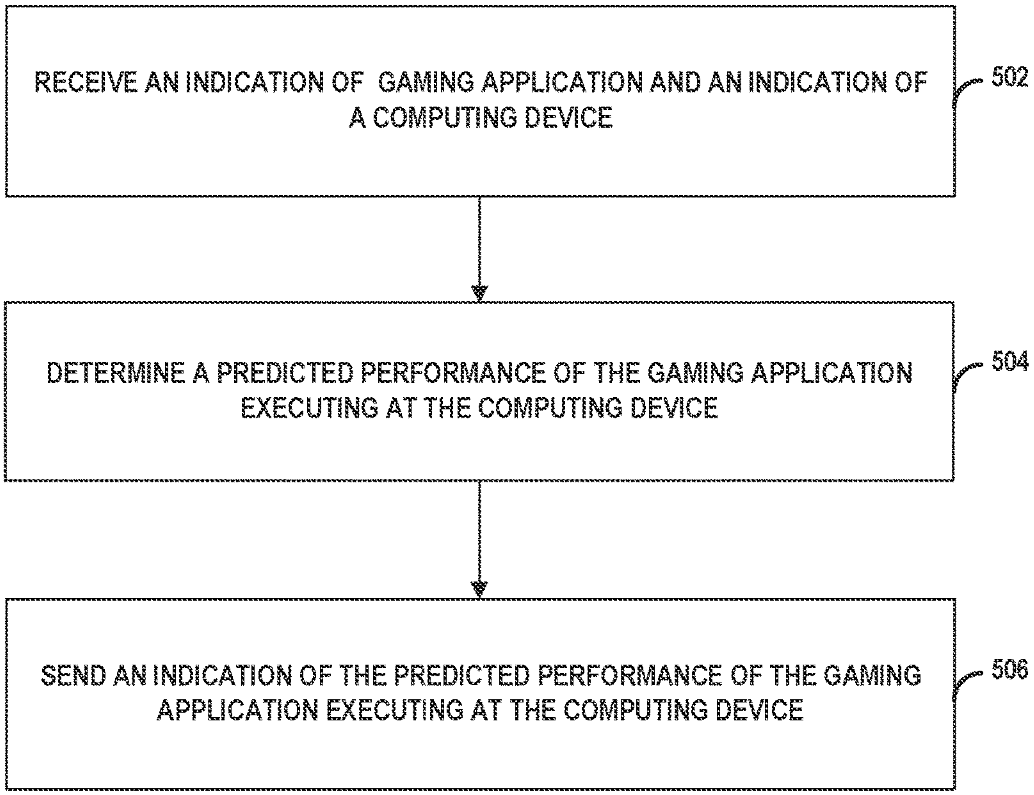
FIG. 5 is a flowchart illustrating an example mode of operation for a computing system to determine the predicted performance of a gaming application executing at a computing device using collaborative filtering, in accordance with one or more techniques of the present disclosure.

FIG. 5 is a flowchart illustrating an example mode of operation for a computing system to determine the predicted performance of a gaming application executing at a computing device, in accordance with one or more techniques of the present disclosure. FIG. 5 is described below in the context of FIGS. 1 and 2.

As shown in FIG. 5, one or more processors 240 of computing system 250 may receive an indication of gaming application 112 and an indication of a computing device 102 (502). For example, one or more processors 240 may receive, via one or more communication units 244, an indication of gaming application 112 and an indication of a computing device 102. The indication of gaming application 112 may include One or more processors 240 may determine, using collaborative filtering of performance scores of a plurality of gaming applications executing at a plurality of computing devices, a predicted performance of the gaming application 112 executing at the computing device 102 (504). In some examples, the predicted performance of the gaming application 112 executing at the computing device 102 includes frame rate information for the gaming application 112 executing at the computing device 102.

In some examples, to determine, using collaborative filtering of performance scores of a plurality of gaming applications executing at a plurality of computing devices, a predicted performance of the gaming application 112 executing at the computing device 102, one or more processors 240 may determine a first aggregated performance of the gaming application 112 across two or more of the plurality of computing devices and may determine aggregated performances of the plurality of gaming applications across the two or more of the plurality of computing devices. One or more processors 240 may determine a second gaming application of the plurality of gaming applications having a second aggregated performance across the two or more of the plurality of computing devices that is most similar to the first aggregated performance of the gaming application 112 out of the aggregated performances. One or more processors 240 may determine the predicted performance of the gaming application 112 based at least in part on a performance of the second gaming application executing at a second computing device that corresponds to the computing device 102.

In some examples, to determine, using collaborative filtering of performance scores of a plurality of gaming applications executing at a plurality of computing devices, a predicted performance of the gaming application 112 executing at the computing device 102, one or more processors 240 may determine a first aggregated performance of a first computing device across two or more of the plurality of gaming applications, wherein the first computing device corresponds to the computing device 102 and may determine aggregated performances of the plurality of computing devices across the two or more of the plurality of gaming applications. One or more processors 240 may determine a second computing device of the plurality of computing devices having a second aggregated performance across the two or more of the plurality of gaming applications that is most similar to the first aggregated performance of the first computing device out of the aggregated performances. One or more processors 240 may determine the predicted performance of the gaming application 112 based at least in part on a performance of the gaming application 112 executing at the second computing device.

In some examples, to determine, using collaborative filtering of the performance scores of the plurality of gaming applications executing at the plurality of computing devices, the predicted performance of the gaming application 112 at the computing device 102, one or more processors 240 may determine, using one or more neural networks (e.g., gaming performance model 264) trained to perform collaborative filtering of the performance scores of the plurality of gaming applications executing at the plurality of computing devices, the predicted performance of the gaming application 112 at the computing device 102. In some examples, the one or more neural networks are trained based on minimizing a loss function associated with a difference between a respective predicted performance score and a respective actual performance score for each of a plurality of combinations of the plurality of gaming applications and the plurality of computing devices.

One or more processors 240 may send an indication of the predicted performance of the gaming application 112 executing at the computing device 102 (506). For example, One or more processors 240 may send, via one or more communication units 244 to the computing device 102, the indication of the predicted performance of the gaming application 112 executing at the computing device 102 to enable the computing device 102 to adjust one or more fidelity parameters of the gaming application 112 based at least in part on the predicted performance of the gaming application.

This disclosure includes the following examples.

Example 1. A method comprising: receiving, by one or more processors of a computing system, an indication of gaming application and an indication of a computing device; determining, by the one or more processors and using collaborative filtering of performance scores of a plurality of gaming applications executing at a plurality of computing devices, a predicted performance of the gaming application executing at the computing device; and sending, by the one or more processors, an indication of the predicted performance of the gaming application executing at the computing device.

Example 2. The method of example 1, wherein determining, using collaborative filtering of the performance scores of the plurality of gaming applications executing at the plurality of computing devices, the predicted performance of the gaming application at the computing device further comprises: determining, by the one or more processors, a first aggregated performance of the gaming application across two or more of the plurality of computing devices; determining, by the one or more processors, aggregated performances of the plurality of gaming applications across the two or more of the plurality of computing devices; determining, by one or more processors, a second gaming application of the plurality of gaming applications having a second aggregated performance across the two or more of the plurality of computing devices that is most similar to the first aggregated performance of the gaming application out of the aggregated performances; and determining, by the one or more processors, the predicted performance of the gaming application based at least in part on a performance of the second gaming application executing at a second computing device that corresponds to the computing device.

Example 3. The method of example 1, wherein determining, using collaborative filtering of the performance scores of the plurality of gaming applications executing at the plurality of computing devices, the predicted performance of the gaming application at the computing device further comprises: determining, by the one or more processors, a first aggregated performance of a first computing device across two or more of the plurality of gaming applications, wherein the first computing device corresponds to the computing device; determining, by the one or more processors, aggregated performances of the plurality of computing devices across the two or more of the plurality of gaming applications; determining, by one or more processors, a second computing device of the plurality of computing devices having a second aggregated performance across the two or more of the plurality of gaming applications that is most similar to the first aggregated performance of the first computing device out of the aggregated performances; and determining, by the one or more processors, the predicted performance of the gaming application based at least in part on a performance of the gaming application executing at the second computing device.

Example 4. The method of any of examples 1-3, wherein determining, using collaborative filtering of the performance scores of the plurality of gaming applications executing at the plurality of computing devices, the predicted performance of the gaming application at the computing device further comprises: determining, by the one or more processors and using one or more neural networks trained to perform collaborative filtering of the performance scores of the plurality of gaming applications executing at the plurality of computing devices, the predicted performance of the gaming application at the computing device.

Example 5. The method of example 4, wherein the one or more neural networks are trained based on minimizing a loss function associated with a difference between a respective predicted performance score and a respective actual performance score for each of a plurality of combinations of the plurality of gaming applications and the plurality of computing devices.

Example 6. The method of any of examples 1-5, wherein the predicted performance of the gaming application executing at the computing device comprises frame rate information for the gaming application executing at the computing device.

Example 7. The method of any of examples 1-6, wherein sending the indication of the predicted performance of the gaming application executing at the computing device further comprises: sending, by the one or more processors to the computing device, the indication of the predicted performance of the gaming application executing at the computing device to enable the computing device to adjust one or more fidelity parameters of the gaming application based at least in part on the predicted performance of the gaming application.

Example 8. A computing system comprising: memory; a network interface; and one or more processors operably coupled to the memory and the network interface and configured to: receive, via the network interface, an indication of gaming application and an indication of a computing device; determine, using collaborative filtering of performance scores of a plurality of gaming applications executing at a plurality of computing devices, a predicted performance of the gaming application executing at the computing device; and send, via the network interface, an indication of the predicted performance of the gaming application executing at the computing device.

Example 9. The computing system of example 8, wherein to determine, using collaborative filtering of the performance scores of the plurality of gaming applications executing at the plurality of computing devices, the predicted performance of the gaming application at the computing device, the one or more processors are further configured to: determine a first aggregated performance of the gaming application across two or more of the plurality of computing devices; determine aggregated performances of the plurality of gaming applications across the two or more of the plurality of computing devices; determine a second gaming application of the plurality of gaming applications having a second aggregated performance across the two or more of the plurality of computing devices that is most similar to the first aggregated performance of the gaming application out of the aggregated performances; and determine the predicted performance of the gaming application based at least in part on a performance of the second gaming application executing at a second computing device that corresponds to the computing device.

Example 10. The computing system of example 8, wherein to determine, using collaborative filtering of the performance scores of the plurality of gaming applications executing at the plurality of computing devices, the predicted performance of the gaming application at the computing device, the one or more processors are further configured to: determine a first aggregated performance of a first computing device across two or more of the plurality of gaming applications, wherein the first computing device corresponds to the computing device; determine aggregated performances of the plurality of computing devices across the two or more of the plurality of gaming applications; determine a second computing device of the plurality of computing devices having a second aggregated performance across the two or more of the plurality of gaming applications that is most similar to the first aggregated performance of the first computing device out of the aggregated performances; and determine the predicted performance of the gaming application based at least in part on a performance of the gaming application executing at the second computing device.

Example 11. The computing system of any of examples 8-10, wherein to determine, using collaborative filtering of the performance scores of the plurality of gaming applications executing at the plurality of computing devices, the predicted performance of the gaming application at the computing device, the one or more processors are further configured to: determine, using one or more neural networks trained to perform collaborative filtering of the performance scores of the plurality of gaming applications executing at the plurality of computing devices, the predicted performance of the gaming application at the computing device.

Example 12. The computing system of example 11, wherein the one or more neural networks are trained based on minimizing a loss function associated with a difference between a respective predicted performance score and a respective actual performance score for each of a plurality of combinations of the plurality of gaming applications and the plurality of computing devices.

Example 13. The computing system of any of examples 8-12, wherein the predicted performance of the gaming application executing at the computing device comprises frame rate information for the gaming application executing at the computing device.

Example 14. The computing system of any of examples 8-13, wherein to send the indication of the predicted performance of the gaming application executing at the computing device, the one or more processors are further configured to: send, to the computing device, the indication of the predicted performance of the gaming application executing at the computing device to enable the computing device to adjust one or more fidelity parameters of the gaming application based at least in part on the predicted performance of the gaming application.

Example 15. A computer-readable storage medium storing instructions that, when executed, cause one or more processors of a computing system to: receive an indication of gaming application and an indication of a computing device; determine, using collaborative filtering of performance scores of a plurality of gaming applications executing at a plurality of computing devices, a predicted performance of the gaming application executing at the computing device; and send an indication of the predicted performance of the gaming application executing at the computing device.

Example 16. The computer-readable storage medium of example 15, wherein the instructions that cause the one or more processors to determine, using collaborative filtering of the performance scores of the plurality of gaming applications executing at the plurality of computing devices, the predicted performance of the gaming application at the computing device further cause the one or more processors to: determine a first aggregated performance of the gaming application across two or more of the plurality of computing devices; determine aggregated performances of the plurality of gaming applications across the two or more of the plurality of computing devices; determine a second gaming application of the plurality of gaming applications having a second aggregated performance across the two or more of the plurality of computing devices that is most similar to the first aggregated performance of the gaming application out of the aggregated performances; and determine the predicted performance of the gaming application based at least in part on a performance of the second gaming application executing at a second computing device that corresponds to the computing device.

Example 17. The computer-readable storage medium of example 15, wherein the instructions that cause the one or more processors to determine, using collaborative filtering of the performance scores of the plurality of gaming applications executing at the plurality of computing devices, the predicted performance of the gaming application at the computing device further cause the one or more processors to: determine a first aggregated performance of a first computing device across two or more of the plurality of gaming applications, wherein the first computing device corresponds to the computing device; determine aggregated performances of the plurality of computing devices across the two or more of the plurality of gaming applications; determine a second computing device of the plurality of computing devices having a second aggregated performance across the two or more of the plurality of gaming applications that is most similar to the first aggregated performance of the first computing device out of the aggregated performances; and determine the predicted performance of the gaming application based at least in part on a performance of the gaming application executing at the second computing device.

Example 18. The computer-readable storage medium of any of examples 15-17, wherein the instructions that cause the one or more processors to determine, using collaborative filtering of the performance scores of the plurality of gaming applications executing at the plurality of computing devices, the predicted performance of the gaming application at the computing device further cause the one or more processors to: determine, using one or more neural networks trained to perform collaborative filtering of the performance scores of the plurality of gaming applications executing at the plurality of computing devices, the predicted performance of the gaming application at the computing device.

Example 19. The computer-readable storage medium of example 18, wherein the one or more neural networks are trained based on minimizing a loss function associated with a difference between a respective predicted performance score and a respective actual performance score for each of a plurality of combinations of the plurality of gaming applications and the plurality of computing devices.

Example 20. The computer-readable storage medium of any of examples 15-19, wherein the predicted performance of the gaming application executing at the computing device comprises frame rate information for the gaming application executing at the computing device.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:

receiving, by one or more processors of a computing system, an indication of a gaming application and an indication of a computing device;

determining, by the one or more processors and using collaborative filtering of performance scores of a plurality of gaming applications executing at a plurality of computing devices, a predicted performance of the gaming application executing at the computing device by at least:

determining, by the one or more processors, a second computing device of the plurality of computing devices having a second aggregated performance across two or more gaming applications, wherein the second aggregated performance is most similar to an aggregated performance of the computing device across the two or more gaming applications; and determining, by the one or more processors, the predicted performance of the gaming application based at least in part on a performance of the gaming application executing at the second computing device; and sending, by the one or more processors, an indication of the predicted performance of the gaming application executing at the computing device, wherein the indication of the predicted performance is configured to cause the computing device to adjust one or more fidelity parameters of the gaming application based at least in part on the predicted performance of the gaming application, wherein the one or more fidelity parameters include at least image fidelity, target frame rate, rendering quality, or model quality, and wherein the indication of the predicted performance includes one or more optimal fidelity parameters.

2. The method of claim 1, wherein determining, using collaborative filtering of the performance scores of the plurality of gaming applications executing at the plurality of computing devices, the predicted performance of the gaming application at the computing device further comprises:

determining, by the one or more processors and using one or more neural networks trained to perform collaborative filtering of the performance scores of the plurality of gaming applications executing at the plurality of computing devices, the predicted performance of the gaming application at the computing device.

3. The method of claim 2, wherein the one or more neural networks are trained based on minimizing a loss function associated with a difference between a respective predicted performance score and a respective actual performance score for each of a plurality of combinations of the plurality of gaming applications and the plurality of computing devices.

4. The method of claim 1, wherein the predicted performance of the gaming application executing at the computing device comprises frame rate information for the gaming application executing at the computing device.

5. A computing system comprising:

memory;

a network interface; and one or more processors operably coupled to the memory and the network interface and configured to:

receive, via the network interface, an indication of a gaming application and an indication of a computing device;

determine, using collaborative filtering of performance scores of a plurality of gaming applications executing at a plurality of computing devices, a predicted performance of the gaming application executing at the computing device by at least:

determining a second computing device of the plurality of computing devices having a second aggregated performance across two or more gaming applications, wherein the second aggregated performance is most similar to an aggregated performance of the computing device across the two or more gaming applications; and determining the predicted performance of the gaming application based at least in part on a performance of the gaming application executing at the second computing device; and send, via the network interface, an indication of the predicted performance of the gaming application executing at the computing device, wherein the indication of the predicted performance is configured to cause the computing device to adjust one or more fidelity parameters of the gaming application based at least in part on the predicted performance of the gaming application, wherein the one or more fidelity parameters include at least image fidelity, target frame rate, rendering quality, or model quality, and wherein the indication of the predicted performance includes one or more optimal fidelity parameters.

6. The computing system of claim 5, wherein to determine, using collaborative filtering of the performance scores of the plurality of gaming applications executing at the plurality of computing devices, the predicted performance of the gaming application at the computing device, the one or more processors are further configured to:

determine, using one or more neural networks trained to perform collaborative filtering of the performance scores of the plurality of gaming applications executing at the plurality of computing devices, the predicted performance of the gaming application at the computing device.

7. The computing system of claim 6, wherein the one or more neural networks are trained based on minimizing a loss function associated with a difference between a respective predicted performance score and a respective actual performance score for each of a plurality of combinations of the plurality of gaming applications and the plurality of computing devices.

8. The computing system of claim 5, wherein the predicted performance of the gaming application executing at the computing device comprises frame rate information for the gaming application executing at the computing device.

9. A non-transitory computer-readable storage medium storing instructions that, when executed, cause one or more processors of a computing system to:

receive an indication of a gaming application and an indication of a computing device;

determine, using collaborative filtering of performance scores of a plurality of gaming applications executing at a plurality of computing devices, a predicted performance of the gaming application executing at the computing device by at least:

determining a second computing device of the plurality of computing devices having a second aggregated performance across two or more gaming applications, wherein the second aggregated performance is most similar to an aggregated performance of the computing device across the two or more gaming applications; and determining the predicted performance of the gaming application based at least in part on a performance of the gaming application executing at the second computing device; and send an indication of the predicted performance of the gaming application executing at the computing device, wherein the indication of the predicted performance is configured to cause the computing device to adjust one or more fidelity parameters of the gaming application based at least in part on the predicted performance of the gaming application, wherein the one or more fidelity parameters include at least image fidelity, target frame rate, rendering quality, or model quality, and wherein the indication of the predicted performance includes one or more optimal fidelity parameters.

10. The non-transitory computer-readable storage medium of claim 9, wherein the instructions that cause the one or more processors to determine, using collaborative filtering of the performance scores of the plurality of gaming applications executing at the plurality of computing devices, the predicted performance of the gaming application at the computing device further cause the one or more processors to:

determine, using one or more neural networks trained to perform collaborative filtering of the performance scores of the plurality of gaming applications executing at the plurality of computing devices, the predicted performance of the gaming application at the computing device.

11. The non-transitory computer-readable storage medium of claim 10, wherein the one or more neural networks are trained based on minimizing a loss function associated with a difference between a respective predicted performance score and a respective actual performance score for each of a plurality of combinations of the plurality of gaming applications and the plurality of computing devices.

12. The non-transitory computer-readable storage medium of claim 9, wherein the predicted performance of the gaming application executing at the computing device comprises frame rate information for the gaming application executing at the computing device.

13. A method comprising:

receiving, by one or more processors of a computing system, an indication of a gaming application and an indication of a computing device;

determining, by the one or more processors and using collaborative filtering of performance scores of a plurality of gaming applications executing at a plurality of computing devices, a predicted performance of the gaming application executing at the computing device by at least:

determining, by the one or more processors, a second gaming application of the plurality of gaming applications having a second aggregated performance across two or more computing devices, wherein the second aggregated performance is most similar to an aggregated performance of the gaming application across the two or more computing devices; and determining, by the one or more processors, the predicted performance of the gaming application based at least in part on a performance of the second gaming application executing at a second computing device that corresponds to the computing device; and sending, by the one or more processors, an indication of the predicted performance of the gaming application executing at the computing device, wherein the indication of the predicted performance is configured to cause the computing device to adjust one or more fidelity parameters of the gaming application based at least in part on the predicted performance of the gaming application, wherein the one or more fidelity parameters include at least image fidelity, target frame rate, rendering quality, or model quality, and wherein the indication of the predicted performance includes one or more optimal fidelity parameters.

14. The method of claim 13, wherein determining, using collaborative filtering of the performance scores of the plurality of gaming applications executing at the plurality of computing devices, the predicted performance of the gaming application at the computing device further comprises:

determining, by the one or more processors and using one or more neural networks trained to perform collaborative filtering of the performance scores of the plurality of gaming applications executing at the plurality of computing devices, the predicted performance of the gaming application at the computing device.

15. The method of claim 14, wherein the one or more neural networks are trained based on minimizing a loss function associated with a difference between a respective predicted performance score and a respective actual performance score for each of a plurality of combinations of the plurality of gaming applications and the plurality of computing devices.

16. The method of claim 13, wherein the predicted performance of the gaming application executing at the computing device comprises frame rate information for the gaming application executing at the computing device.

* * * * *